(12) United States Patent
Hirabayashi et al.

(10) Patent No.: US 12,108,116 B2
(45) Date of Patent: *Oct. 1, 2024

(54) MOBILE TERMINAL AND VIDEO DISPLAY APPARATUS

(71) Applicant: Maxell, Ltd., Kyoto (JP)

(72) Inventors: Masayuki Hirabayashi, Ibaraki (JP); Motoyuki Suzuki, Ibaraki (JP); Hideo Nishijima, Ibaraki (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,723

(22) Filed: Jun. 9, 2023

(65) Prior Publication Data

US 2023/0336825 A1    Oct. 19, 2023

Related U.S. Application Data

(63) Continuation of application No. 17/496,953, filed on Oct. 8, 2021, now Pat. No. 11,711,585, which is a
(Continued)

(51) Int. Cl.
*H04N 21/472* (2011.01)
*H04N 21/41* (2011.01)
(Continued)

(52) U.S. Cl.
CPC .  *H04N 21/47214* (2013.01); *H04N 21/41265* (2020.08); *H04N 21/41407* (2013.01);
(Continued)

(58) Field of Classification Search
None
See application file for complete search history.

(56) References Cited

U.S. PATENT DOCUMENTS 8,024,073 B2    9/2011  Imes
8,396,604 B2    3/2013  Imes
(Continued)

FOREIGN PATENT DOCUMENTS

JP    2003-199139 A    7/2003
JP    2003-348560 A   12/2003
(Continued)

OTHER PUBLICATIONS

International Search Report of PCT/JP2013/070686 mailed Sep. 3, 2013.
(Continued)

*Primary Examiner* — Ricky Chin
(74) *Attorney, Agent, or Firm* — Mattingly & Malur, PC

(57) ABSTRACT

A mobile terminal has a communication processing unit that transmits, to a video display apparatus for displaying a broadcasted video content, a request for setting a viewing schedule of the video content. A storage unit stores a starting time of the video content for which the setting of the viewing schedule has been requested; and an information provision unit provides information to a user of the mobile terminal. A control unit determines whether the video display apparatus is existent around the mobile terminal. At a first predetermined time before the starting time, the information provision unit notifies the user of the first predetermined time. If the video display apparatus is not existent around the mobile terminal at a second predetermined time before the starting time, the information provision unit then notifies the user that it is the second predetermined time before the starting time.

14 Claims, 29 Drawing Sheets

Related U.S. Application Data continuation of application No. 15/899,670, filed on Feb. 20, 2018, now Pat. No. 11,159,853, which is a continuation of application No. 14/903,365, filed as application No. PCT/JP2013/070686 on Jul. 31, 2013, now Pat. No. 10,555,042.

(51) Int. Cl.

| | | |
|---|---|---|
| *H04N 21/414* | (2011.01) | |
| *H04N 21/422* | (2011.01) | |
| *H04N 21/4227* | (2011.01) | |
| *H04N 21/433* | (2011.01) | |
| *H04N 21/458* | (2011.01) | |
| *H04N 21/482* | (2011.01) | |
| *H04N 21/488* | (2011.01) | |

(52) U.S. Cl.
CPC ..... *H04N 21/4222* (2013.01); *H04N 21/4227* (2013.01); *H04N 21/4334* (2013.01); *H04N 21/458* (2013.01); *H04N 21/482* (2013.01); *H04N 21/4882* (2013.01)

(56) References Cited

U.S. PATENT DOCUMENTS

| | | | |
|---|---|---|---|
| 8,412,382 | B2 | 4/2013 | Imes |
| 10,110,939 | B1 | 10/2018 | Wittke |
| 10,779,055 | B2 | 9/2020 | Hathaway |
| 11,159,853 | B2 | 10/2021 | Hirabayashi |
| 11,711,585 | B2 * | 7/2023 | Hirabayashi ......... H04N 21/458 725/33 |
| 2003/0023489 | A1 | 1/2003 | McGuire |
| 2004/0117249 | A1 | 6/2004 | Wang |
| 2006/0239642 | A1 | 10/2006 | Yuasa et al. |
| 2007/0234389 | A1 | 10/2007 | Tsukamoto |
| 2007/0290876 | A1 | 12/2007 | Sato et al. |
| 2008/0052741 | A1 | 2/2008 | Dharmaji |
| 2008/0141304 | A1 | 6/2008 | Otsu et al. |
| 2008/0250457 | A1 | 10/2008 | Ohno |
| 2009/0018763 | A1 | 1/2009 | Koga |
| 2009/0100478 | A1 | 4/2009 | Craner |
| 2009/0142042 | A1 | 6/2009 | Branam |
| 2009/0165049 | A1* | 6/2009 | Sekiguchi ......... H04N 21/41265 725/39 |
| 2009/0234659 | A1 | 9/2009 | Liao et al. |
| 2010/0125870 | A1 | 5/2010 | Ukawa |
| 2010/0222079 | A1* | 9/2010 | Lee ..................... G01C 21/343 704/235 |
| 2011/0054710 | A1 | 3/2011 | Imes et al. |
| 2011/0083154 | A1 | 4/2011 | Boersma |
| 2011/0088067 | A1 | 4/2011 | Azuma et al. |
| 2011/0154403 | A1 | 6/2011 | Sinha |
| 2011/0197221 | A1 | 8/2011 | Rouse |
| 2011/0231521 | A1 | 9/2011 | Higgins |
| 2011/0257881 | A1 | 10/2011 | Chen et al. |
| 2011/0282719 | A1 | 11/2011 | Turner |
| 2011/0286719 | A1 | 11/2011 | Woods |
| 2011/0316671 | A1 | 12/2011 | Yaguchi et al. |
| 2012/0072107 | A1* | 3/2012 | Okude ................. G01C 21/343 701/527 |
| 2012/0136572 | A1 | 5/2012 | Norton |
| 2012/0245847 | A1* | 9/2012 | Cheng .................... G06Q 10/10 701/527 |
| 2012/0310838 | A1 | 12/2012 | Harris |
| 2013/0047174 | A1 | 2/2013 | Lee et al. |
| 2013/0106738 | A1 | 5/2013 | Kim et al. |
| 2013/0147623 | A1 | 6/2013 | Somasundaram et al. |
| 2013/0151143 | A1* | 6/2013 | Lee ...................... G01C 21/343 701/425 |
| 2013/0158846 | A1 | 6/2013 | Zhang |
| 2013/0304526 | A1 | 11/2013 | Boyd |
| 2013/0343727 | A1 | 12/2013 | Rav-Acha |
| 2014/0028918 | A1 | 1/2014 | Kim |
| 2014/0059608 | A1 | 2/2014 | Beattie et al. |
| 2014/0164089 | A1 | 6/2014 | Joa |
| 2014/0207680 | A1 | 7/2014 | Rephlo |
| 2014/0250399 | A1 | 9/2014 | Gaherwar |
| 2014/0270714 | A1 | 9/2014 | Osminer |
| 2014/0365107 | A1 | 12/2014 | Dutta |
| 2015/0215738 | A1 | 7/2015 | Frusina |
| 2015/0242877 | A1 | 8/2015 | Bliss |
| 2016/0003637 | A1 | 1/2016 | Andersen |
| 2016/0232558 | A1 | 8/2016 | Postrel |
| 2017/0111694 | A1 | 4/2017 | Marsh |
| 2017/0124671 | A1 | 5/2017 | Tam |
| 2017/0238064 | A1 | 8/2017 | Hathaway |
| 2017/0309072 | A1* | 10/2017 | Li .......................... H04L 67/306 |
| 2017/0358022 | A1* | 12/2017 | Deak .................. G06Q 30/0631 |
| 2018/0157745 | A1 | 6/2018 | Williams |
| 2018/0176651 | A1 | 6/2018 | Hirabayashi |
| 2018/0234707 | A1 | 8/2018 | Pujia |
| 2018/0350403 | A1 | 12/2018 | Bohn |
| 2019/0072408 | A1 | 3/2019 | Lee |
| 2019/0139089 | A1* | 5/2019 | Sood .................... G06Q 10/067 |
| 2020/0027116 | A1 | 1/2020 | Royyuru |
| 2020/0042566 | A1 | 2/2020 | Xin |
| 2020/0342040 | A1 | 10/2020 | Adams |
| 2021/0067811 | A1 | 3/2021 | Bates |

FOREIGN PATENT DOCUMENTS

| | | |
|---|---|---|
| JP | 2005-56166 A | 3/2005 |
| JP | 2009-111817 A | 5/2009 |
| JP | 2009-296033 A | 12/2009 |
| JP | 2011-040937 A | 2/2011 |
| WO | 2007/088646 A1 | 8/2007 |

OTHER PUBLICATIONS

Japanese Office Action received in corresponding Japanese Application No. 2017-092711 dated Feb. 13, 2018.

* cited by examiner

F I G. 1
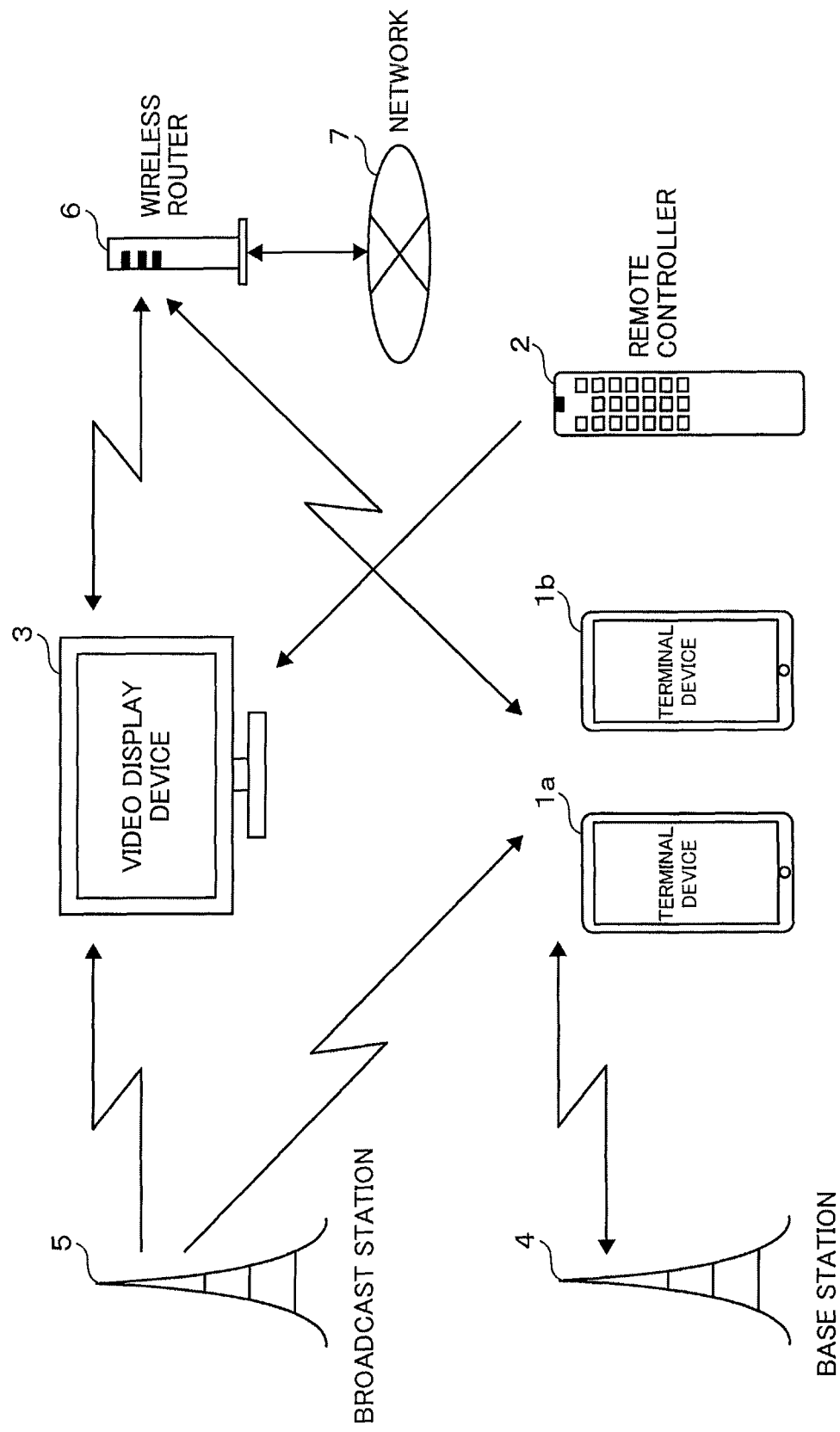

F I G. 8 A

| TIME | 2012/11/15 | 2012/11/16 |
|---|---|---|
| 14:00 | INFORMATION SCIENCE | ALGEBRA |
| 15:00 | PHYSICS EXPERIMENTS | ANALYSIS |
| 16:00 | | ENGLISH |
| 17:00 | | |
| 18:00 | TV VIEWING RESERVATION TERRESTRIAL DIGITAL BROADCASTING 4CH 2012 MUSIC FESTIVAL | |
| 19:00 | | TV VIEWING RESERVATION BS 101CH BS SPORTS |
| 20:00 | | |
| 21:00 | | |

F I G. 8 B

| TIME | 2012/11/15 | 2012/11/16 |
|---|---|---|
| 14:00 | | OUT TO ** COMPANY |
| 15:00 | ○○ MEETING AT MEETING ROOM 201 | |
| 16:00 | | |
| 17:00 | | |
| 18:00 | TV VIEWING RESERVATION TERRESTRIAL DIGITAL BROADCASTING 8CH WEATHER FORECAST | |
| 19:00 | | |
| 20:00 | | |
| 21:00 | TV VIEWING RESERVATION TERRESTRIAL DIGITAL BROADCASTING 1CH TODAY'S NEWS | TV VIEWING RESERVATION TERRESTRIAL DIGITAL BROADCASTING 1CH TODAY'S NEWS |

FIG. 8C

| RESERVATION NUMBER | TERMINAL DEVICE | PROGRAM NAME | BROADCASTING WAVE | CHANNEL | START DATE AND TIME | END DATE AND TIME |
|---|---|---|---|---|---|---|
| 1 | 1a | 2012 MUSIC FESTIVAL | TERRESTRIAL DIGITAL | 4 | 2012.11.15 18:00 | 2012.11.15 20:00 |
| 2 | 1b | WEATHER FORECAST | TERRESTRIAL DIGITAL | 8 | 2012.11.15 18:30 | 2012.11.15 19:00 |
| 3 | 1b | TODAY'S NEWS | TERRESTRIAL DIGITAL | 1 | 2012.11.15 21:00 | 2012.11.15 22:00 |
| 4 | 1a | BS SPORTS | BS | 101 | 2012.11.16 19:00 | 2012.11.16 20:00 |
| 5 | 1b | TODAY'S NEWS | TERRESTRIAL DIGITAL | 1 | 2012.11.16 21:00 | 2012.11.16 22:00 |

F I G. 1 1
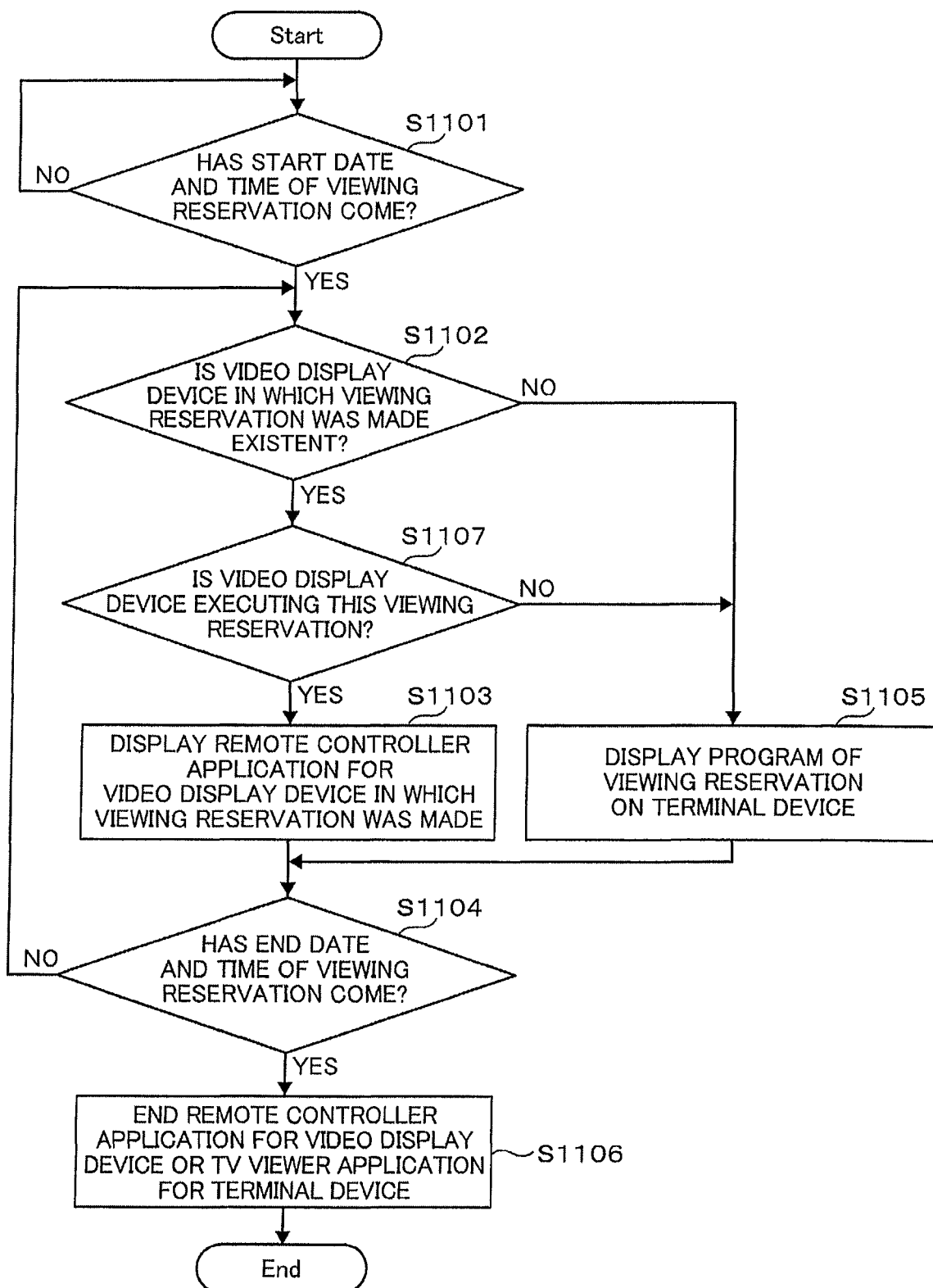

F I G. 1 6
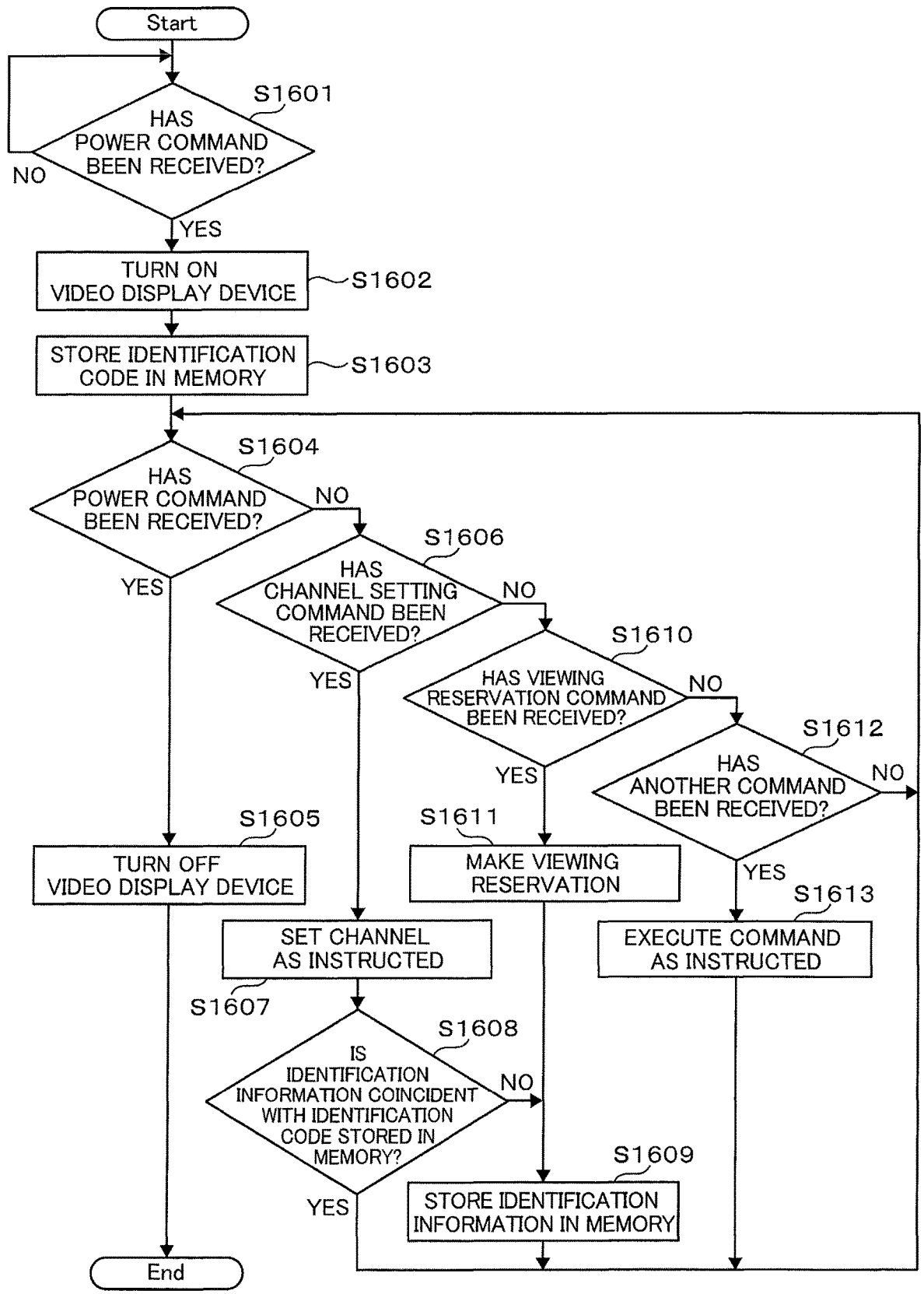

F I G. 1 8

| RESERVATION NUMBER | TERMINAL DEVICE | PROGRAM | BROADCASTING WAVE | CHANNEL | START DATE AND TIME | END DATE AND TIME |
|---|---|---|---|---|---|---|
| 1 | 1a | PROGRAM 1 | TERRESTRIAL DIGITAL | 4 | 2012.11.15 18:00 | 2012.11.15 20:00 |
| 2 | 1b | PROGRAM 2 | TERRESTRIAL DIGITAL | 8 | 2012.11.15 18:30 | 2012.11.15 19:00 |
| 3 | 1b | PROGRAM 3 | TERRESTRIAL DIGITAL | 1 | 2012.11.15 21:00 | 2012.11.15 22:00 |
| 4 | 1a | PROGRAM 4 | BS | 101 | 2012.11.16 19:00 | 2012.11.16 20:00 |
| 5 | 1b | PROGRAM 5 | TERRESTRIAL DIGITAL | 1 | 2012.11.16 21:00 | 2012.11.16 22:00 |

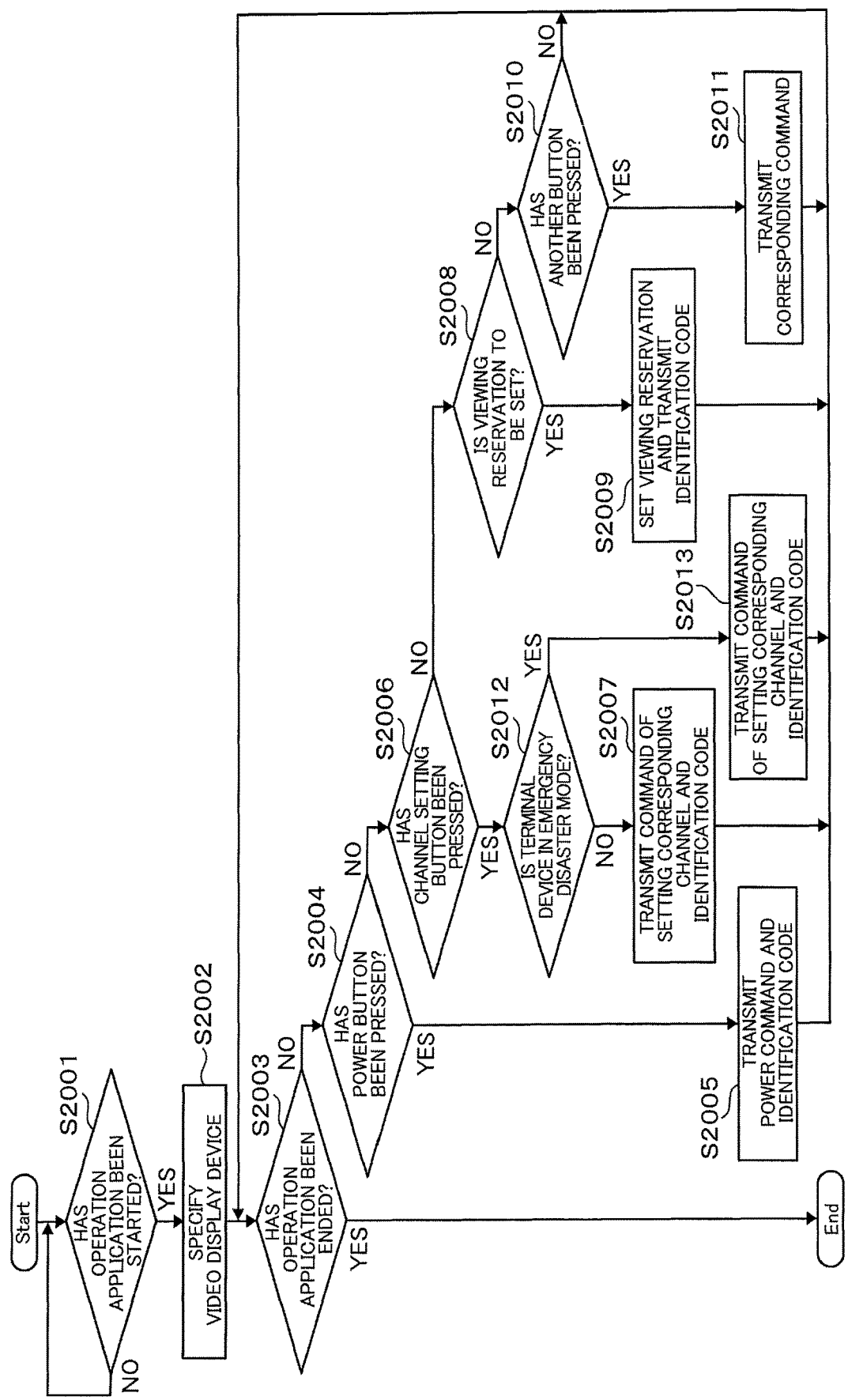
F I G. 2 0

F I G. 2 4
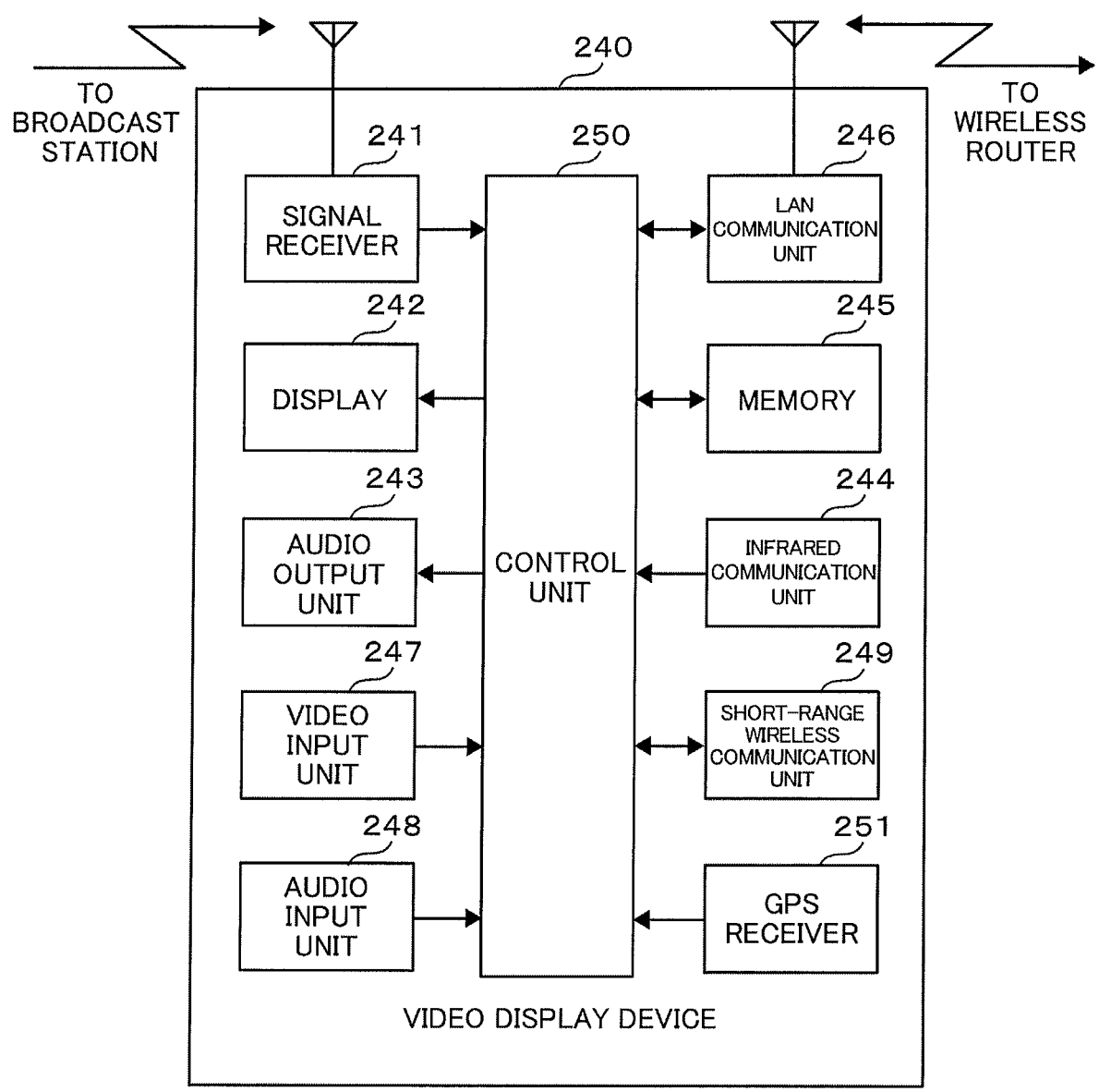

F I G. 2 6

| RESERVATION NUMBER | TERMINAL DEVICE | PROGRAM | BROADCASTING WAVE | CHANNEL | START DATE AND TIME | END DATE AND TIME |
|---|---|---|---|---|---|---|
| 1 | 1a | PROGRAM 1 | TERRESTRIAL DIGITAL | 4 | 2012.11.15 18:00 | 2012.11.15 20:00 |
| 2 | 1b | PROGRAM 2 | TERRESTRIAL DIGITAL | 8 | 2012.11.15 18:30 | 2012.11.15 19:00 |
| 3 | 1a, 1b | PROGRAM 3 | TERRESTRIAL DIGITAL | 1 | 2012.11.15 21:00 | 2012.11.15 22:00 |
| 4 | 1a | PROGRAM 4 | BS | 101 | 2012.11.16 19:00 | 2012.11.16 20:00 |
| 5 | 1b | PROGRAM 5 | TERRESTRIAL DIGITAL | 1 | 2012.11.16 21:00 | 2012.11.16 22:00 |

MOBILE TERMINAL AND VIDEO DISPLAY APPARATUS

TECHNICAL FIELD

The present invention relates to a terminal device and a video display device.

BACKGROUND ART

Japanese Patent Application Publication No. 2003-348560 (Patent Literature 1) is known as background art in this technical field. This publication describes that a problem to be solved is "to prevent a viewer from losing an opportunity of viewing a program that the viewer wants to view in real time".

The solution of this problem is described as "to include a step of receiving viewing-requested program information from a broadcasting terminal device of a viewer and registering the viewing-requested program information for every viewer, a step of acquiring a broadcasting start time of a specific program shown by the viewing-requested program information based on program guide information related to broadcasting schedules of individual programs, a step of transmitting broadcasting-start notification mail to a mobile information terminal of a viewer who requested viewing of the specific program at a predetermined time that is before the acquired broadcasting start time, and a step of sending a stream forming the program at the broadcasting start time based on the program guide information.

CITATION LIST

Patent Literature

Patent Literature 1: Japanese Patent Application Publication No. 2003-348560

SUMMARY OF INVENTION

Technical Problem

According to Patent Literature 1 described above, the viewer who has made the viewing reservation can view the program for which the viewing reservation has been made in real time. However, in a case where the user is in an environment where the user cannot receive mail, the user may not receive the broadcasting-start notification mail.

Therefore, it is an object of the present invention to provide a terminal device and a video display device that are excellent in usability.

Solution to Problem

In order to solve the above problem, configurations recited in the claims are employed, for example.

The present application includes a plurality of solutions for the aforementioned problem. According to an example, a mobile terminal is provided that includes a communication processing unit configured to transmit a video display device displaying a broadcast video content a request of setting a viewing reservation of the video content, a memory configured to store a start time of the video content for which the setting of the viewing reservation has been requested, an information providing unit configured to provide information to a user of the mobile terminal, and a control unit, wherein the control unit determines whether or not the video display device is existent around the mobile terminal, and controls the information providing unit to notify the user that it is a first predetermined time before the start time at the first predetermined time before the start time, and to notify the user that it is a second predetermined time before the start time in a case where the video display device is not existent around the mobile terminal, at the second predetermined time before the start time.

Advantageous Effects of Invention

According to the present invention, it is possible to provide a terminal device and a video display device that are excellent in usability.

A problem, a configuration, and an effect other than the above will be apparent in the following description of embodiments.

BRIEF DESCRIPTION OF DRAWINGS

FIG. 1 is an example of a diagram showing a configuration of a video display system.

FIG. 8A shows an example of a scheduler of the terminal device.

FIG. 8B shows an example of the scheduler of the terminal device.

FIG. 8C shows an example of viewing reservation data of the video display device.

FIG. 11 is an example of the flowchart showing the process of executing the viewing reservation by the terminal device.

FIG. 16 is an example of the flowchart showing the processing by the video display device.

FIG. 18 shows an example of the viewing reservation data in the video display device.

FIG. 20 is an example of the flowchart showing the processing by the terminal device.

FIG. 24 is an example of the block diagram showing the configuration of the video display device.

FIG. 26 shows an example of the viewing reservation data in the video display device.

DESCRIPTION OF EMBODIMENTS

Figure 2:
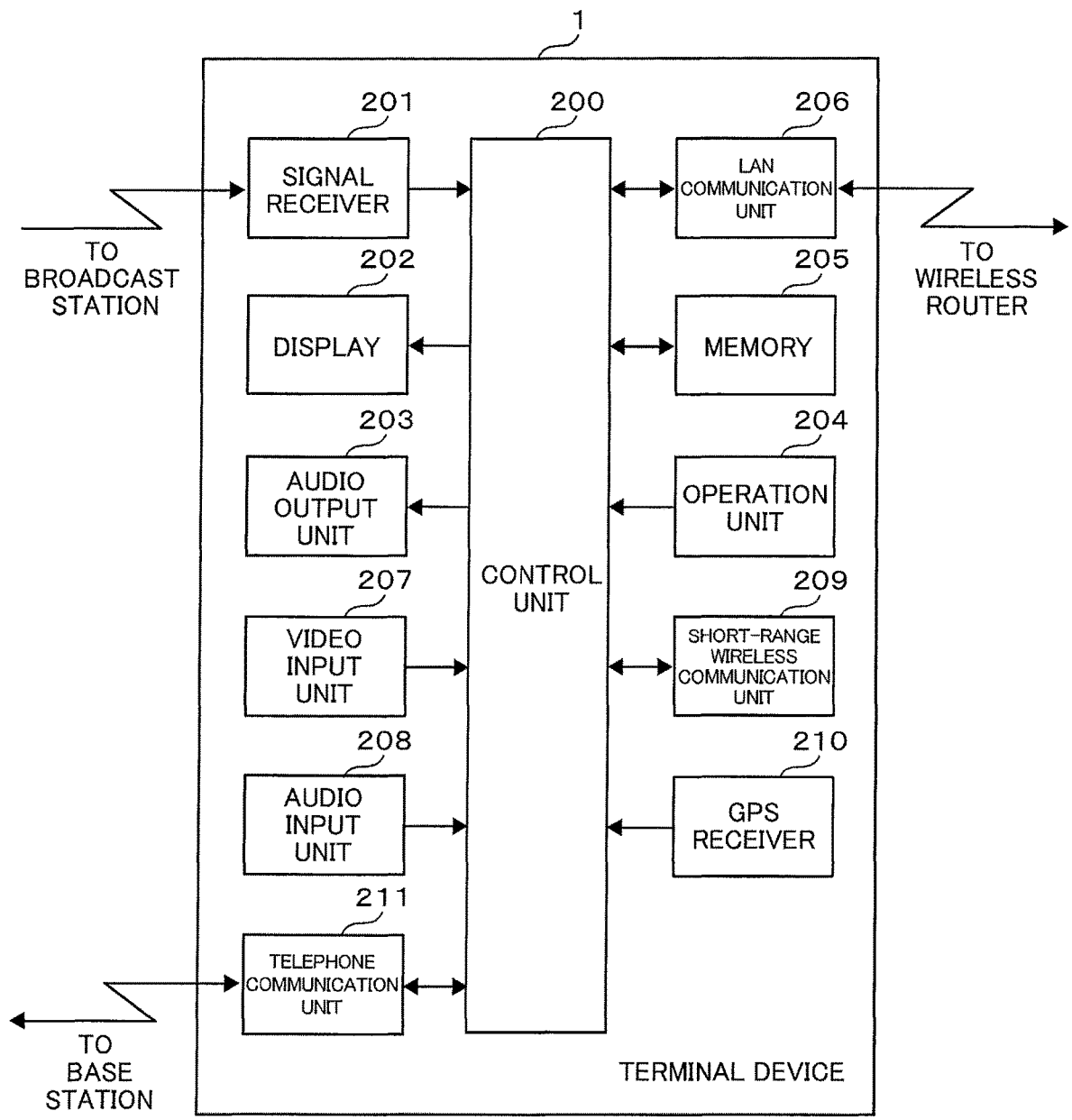
FIG. 2 is an example of a block diagram showing a configuration of a terminal device.

Embodiments are described below with reference to drawings.

First Embodiment

FIG. 1 is a diagram showing a configuration of a video display system according to the first embodiment of the present invention. The video display system of the present embodiment includes a plurality of terminal devices 1 and a video display device 3.

The terminal device 1 has a function of communication with a telephone communication network, and can make/receive a call to/from another terminal device or the like and can transmit/receive mail and various types of information to/from the other terminal device or the like. The terminal device 1 also has a wireless communication function and can transmit/receive various types of information to/from the Internet. Further, the terminal device 1 has a function of performing control for the video display device 3 arranged at a remote place (hereinafter, referred to as "remote control"), so that a user can operate a channel, a volume, and the like of the video display device 3 with the terminal device 1. In addition, the terminal device 1 has a television viewing function that displays a television video content and a function of making a viewing reservation based on a television program guide, and also has a schedule management function that manages the schedule of the user, for example. Note that the terminal devices 1 may be referred to as terminal devices 1a, 1b, . . . if it is necessary to distinguish the terminal devices 1 from each other.

A remote controller 2 is an exclusive control device for the video display device 3 and can perform remote control for the video display device 3 by a wireless communication method using infrared rays, for example.

The video display device 3 is a device that receives and displays a video content. For example, the video display device 3 can receive a television signal from a broadcast station 5 wirelessly or by wire and can display a video content based on the television signal. Also, the video display device 3 can display a video content received from a network 7 via a wireless router 6, e.g., an Internet content at a URL (Uniform Resource Locator) specified by the user or the like. In this manner, the video display device 3 can receive and display the video content distributed from a distribution source specified by the user, or the like, e.g., a specific broadcast station 5 or a specific URL. The video display device 3 is not limited to one. A plurality of video display devices 3 may be provided.

A base station 4 performs wireless communication with the terminal device 1 to relay a call or communication with the telephone communication network.

The broadcast station 5 is equipment outputting the television signal.

The wireless router 6 has a function of a wireless LAN (Local Area Network) such as Wi-Fi (Wireless Fidelity), and can connect to the network 7 via a communication line. The terminal device 1 and the video display device 3 can connect to the wireless router 6, thereby being able to acquire a video content and various types of information from the Internet and display them. Although an example is described in which the wireless router 6 and the video display device 3 are connected wirelessly, they may be connected by wire.

FIG. 2 is a block diagram showing a configuration of the terminal device 1 of FIG. 1.

Respective units of the terminal device 1 are controlled by a control unit 200. The control unit 200 is formed by a CPU (Central Processing Unit), an arbitrary control circuit, or a dedicated circuit such as an ASIC (Appreciation Specific IC), for example.

A signal receiver 201 is formed by an antenna and a signal processing circuit including a tuner and a decoder circuit, for example. The signal receiver 201 receives a television signal output from the broadcast station 5, decodes a video, an audio, and data therefrom, and transmits them to a display 202 and an audio output unit 203.

The display 202 is a liquid crystal panel, for example, and displays various types of information. The audio output unit 203 is formed by an amplifier and a speaker, for example, and outputs various types of audios. An operation unit 204 is a touch pad, for example, and receives an operation by a user and transmits an instruction based on that operation to the control unit 200. An integrated component of the liquid crystal panel and the touch pad that are combined is generally referred to as a touch panel, and an example using the touch panel is described in the present embodiment. However, the terminal device may include the input unit and the display separately.

A memory 205 is formed by a ROM (Read Only Memory), a RAM (Random Access Memory), a flash ROM, or the like, and stores therein a program and various types of setting values for controlling the terminal device 1, for example.

A LAN communication unit 206 uses Wi-Fi, for example, to transmit various types of commands to the video display device 3 via the wireless router 6 or the like. The LAN communication unit 206 also receives status information or the like from the video display device 3. The commands are information for the remote control for the video display device 3 performed by the terminal device 1. For example, the various types of commands include a power command that is an instruction of switching between power on and off, a setting command that is an instruction of a specific channel or volume, and a setting command of making a viewing reservation. Further, the LAN communication unit 206 may use infrared rays, Wi-Fi Direct, or Bluetooth (registered trademark), for example, to transmit/receive the command or the status information directly to/from the video display device 3 without the wireless router 6 or the like.

A video input unit 207 is a camera, and converts light input from a lens into an electric signal, thereby inputting image data of surroundings or an object. An audio input unit 208 is a microphone, and converts a user's voice or the like into audio data and inputs it. A short-range wireless communication unit 209 performs short-range wireless communication by Bluetooth, for example, to input/output various types of data. A GPS (Global Positioning System) receiver 210 is a receiver of a Global Positioning System that can receive electric waves from a satellite to detect the position of the terminal device 1 on the Earth.

A telephone network communication unit 211 performs wireless communication with the base station 4 to communicate with the telephone communication network.

Note that each of the LAN communication unit 206, the short-range wireless communication unit 209, and the telephone communication unit 211 includes a coding circuit, a decoding circuit, an antenna, and the like, and the GPS receiver 210 includes a decoding circuit, an antenna, and the like.

When a command is transmitted, identification information unique to the terminal device 1 is also transmitted. An ID or a telephone number individually assigned to the terminal device 1 can be applied as the identification information. Alternatively, a user ID given to every user by a manufacturer of the terminal device 1 or the like can be applied, because it is generally supposed that one user owns one terminal device 1. In this case, the user ID is stored in the terminal device 1 in advance based on an operation by the user, for example. Alternatively, the terminal device 1 can be identified by authentication of Wi-Fi, for example.

Figure 3:
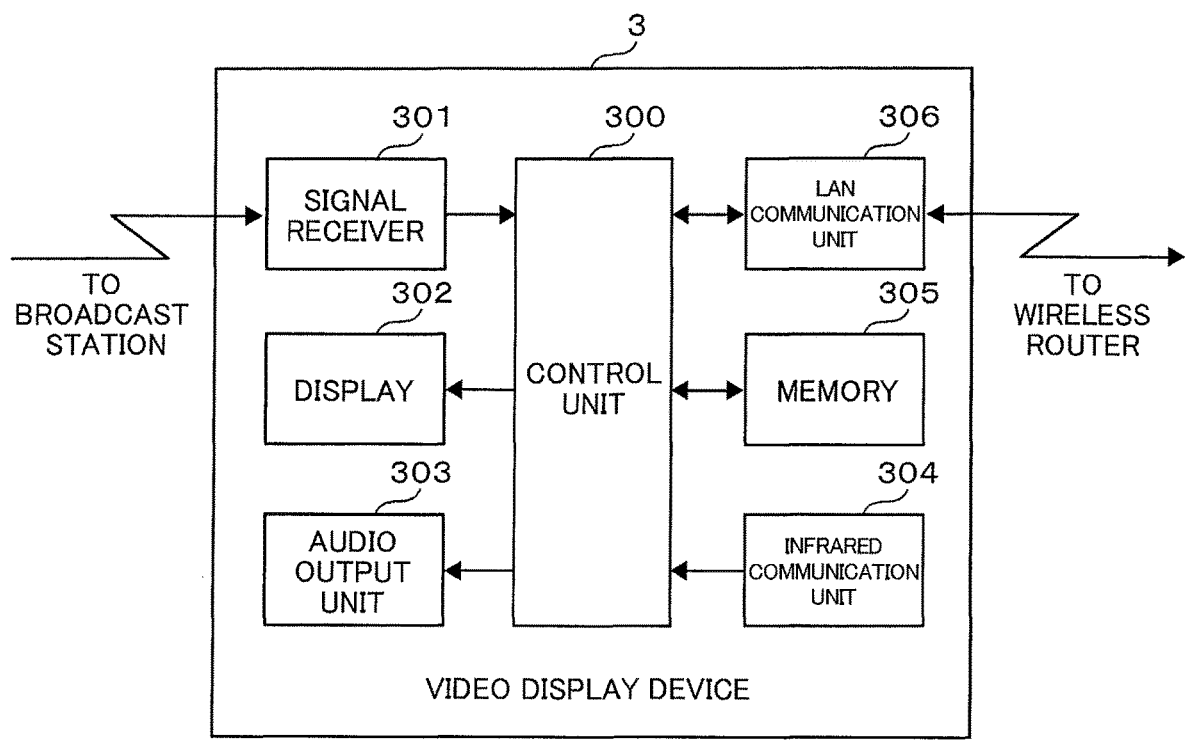
FIG. 3 is an example of a block diagram showing a configuration of a video display device.

FIG. 3 is a block diagram showing a configuration of the video display device 3 of FIG. 1.

Respective units of the video display device 3 are controlled by a control unit 300. The control unit 300 is formed by a CPU, an arbitrary control circuit, or a dedicated circuit such as an ASIC, for example.

A signal receiver 301 is formed by an antenna and a signal processing circuit including a tuner and a decoder circuit, for example. The signal receiver 301 receives a television signal output from the broadcast station 5, decodes a video, an audio, and data therefrom, and transmits them to a display 302 and an audio output unit 303. The signal receiver 301 has a plurality of the aforementioned signal processing circuits and therefore can receive a plurality of channels at once.

The display 302 is formed by a liquid crystal panel, a plasma panel, or an organic EL (ElectroLuminescence) panel, for example, and displays various types of video contents and various types of information.

The audio output unit 303 is formed by an amplifier and a speaker, for example, and outputs various types of audios.

An infrared communication unit 304 uses infrared rays, for example, to receive a control command transmitted from the exclusive remote controller 2, a terminal device having an infrared communication function, or the like, and to transmit the instruction to the control unit 300. In a case where the communication with the remote controller 2 or the like is performed by another method than the one using the infrared rays, the name of the infrared communication unit 304 is changed appropriately, but the function and the operation of the unit 304 are the same.

A memory 305 is formed by a ROM, a RAM, a flash ROM, or the like, and stores therein a program and various types of settings for controlling the video display device 3, video contents, and identification information of the terminal device 1 that has transmitted the various types of commands, for example. Also, the memory 305 stores therein a channel and a time of a program for which a viewing reservation has been made, identification information of the terminal device 1 that has made the viewing reservation, and the like. The memory 305 may include a storage device such as an HDD (Hard Disk Drive) or a BD (Blu-ray (registered trademark) Disc) drive.

A LAN communication unit 306 can connect to the wireless router 6 by wire or wirelessly, thereby being able to receive a video content and the like from the Internet or the like. Also, the LAN communication unit 306 uses Wi-Fi, for example, to receive various types of commands from the terminal device 1 via the wireless router 6 or the like. Further, the LAN communication unit 306 transmits status information to the terminal device 1. The LAN communication unit 306 may use infrared rays, Wi-Fi Direct, or Bluetooth, for example, to transmit/receive the command or the status information directly to/from the terminal device 1 without the wireless router 6 or the like.

Figure 4:
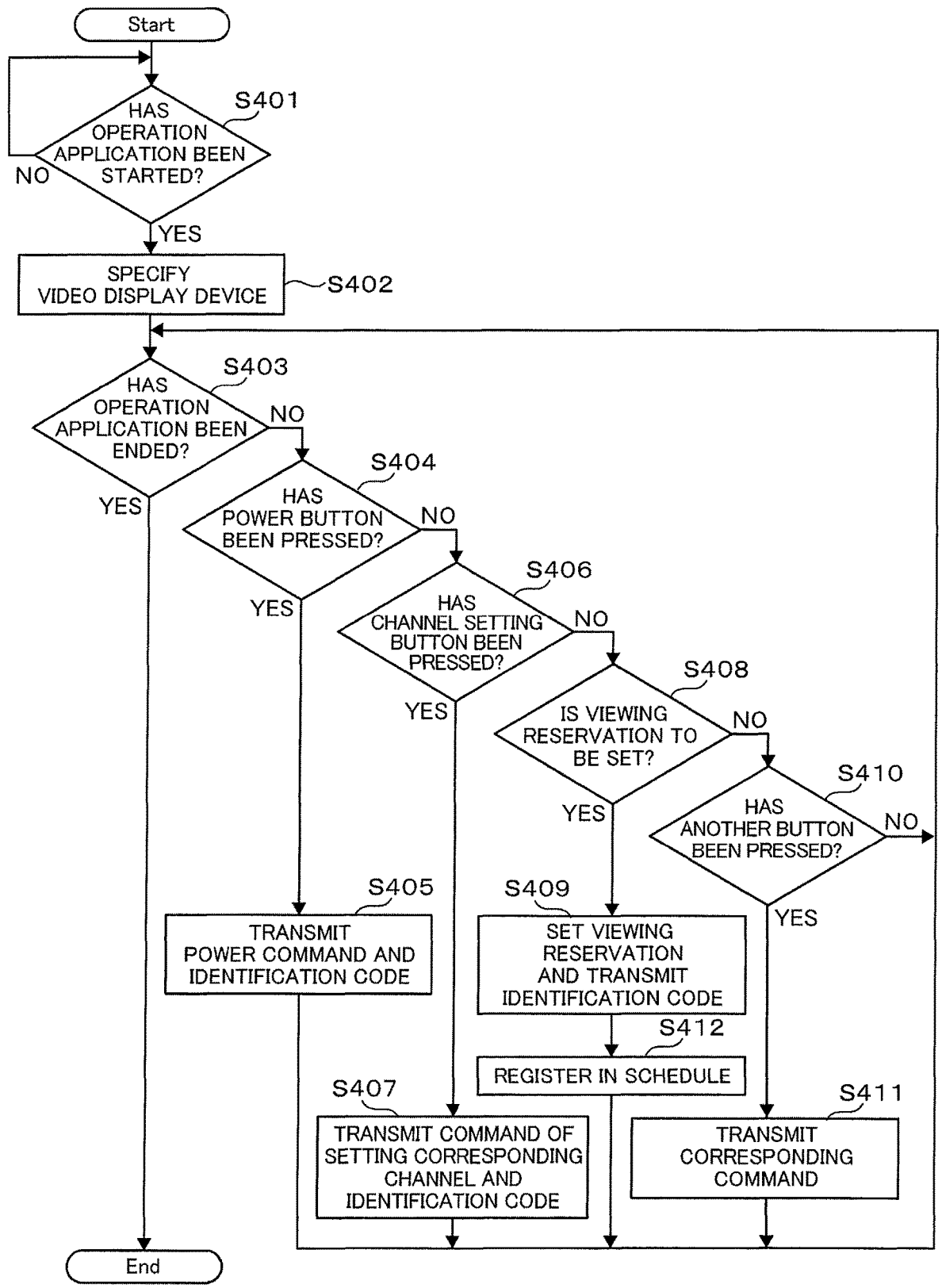
FIG. 4 is an example of a flowchart showing processing by the terminal device.

FIG. 4 is a flowchart showing processing by the terminal device 1 of the first embodiment of the present invention. This flowchart shows processing when the terminal device 1 performs the remote control for the video display device 3.

In Step S401, the terminal device 1 waits for startup of application software for performing the remote control for the video display device 3 (hereinafter, referred to as a "remote controller application") based on an operation by a user.

Figure 5A:
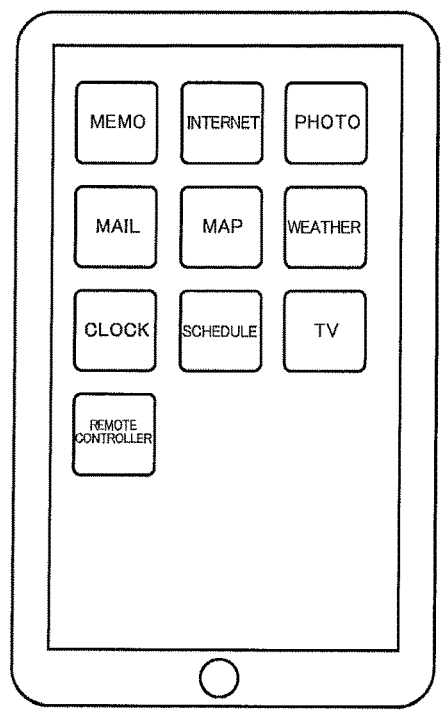
FIG. 5A shows a display example of a screen of the terminal device.

FIG. 5 show various types of display examples of the touch-panel type display 202 of the terminal device 1. The terminal device 1 can perform various functions by starting various types of application software. FIG. 5A illustrates a menu screen in which various types of application software are arranged on the terminal device 1. When the user presses a "remote controller" button displayed in the touch panel, the aforementioned remote controller application is started up. Alternatively, when the user presses a "schedule" button, a schedule management application (hereinafter, referred to as a "scheduler") is started up. When the user presses a "TV" button, a television viewer application is started up.

Figure 5B:
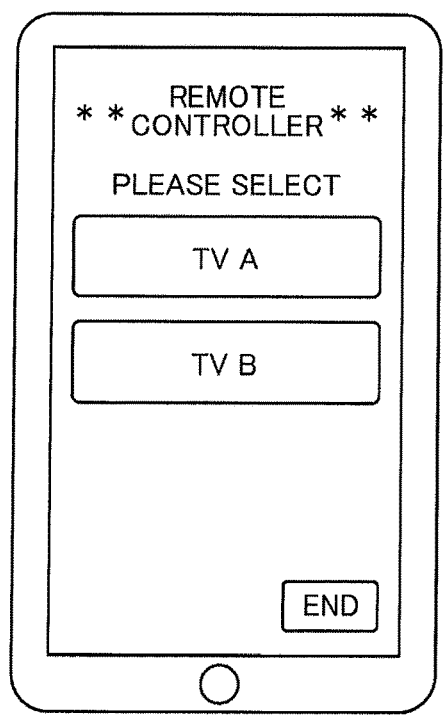
FIG. 5B shows a display example of the screen of the terminal device.

In Step S402, the terminal device 1 selects an object of the remote control based on a user's operation. FIG. 5B shows a display example of a selection screen in a case where there are two video display devices 3 that can be selected as the object of the remote control. It is assumed here that "TV A" is selected.

Figure 5C:
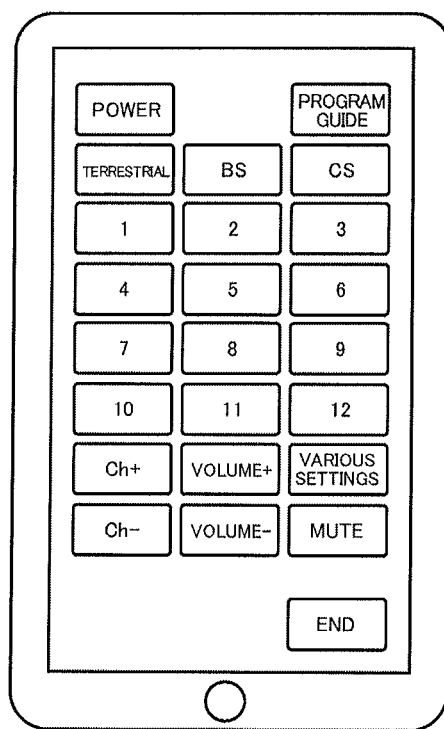
FIG. 5C shows a display example of the screen of the terminal device.

When the video display device 3 has been selected as the object of the remote control, the terminal device 1 displays various instructions that can be transmitted to the video display device 3. FIG. 5C shows a display example of an operation screen of the video display device 3 at that time.

Then, in Step S403, the terminal device 1 confirms whether or not the user has performed an operation for ending the remote controller application. In a case where the operation for ending the remote controller application, e.g., pressing of an "end" button displayed on the terminal device 1 has been performed, the terminal device 1 returns to the step of displaying the menu screen.

In Step S404, the terminal device 1 confirms whether or not a power button has been pressed by the user. In a case where the "power" button displayed on the terminal device 1 has been pressed, the terminal device 1 transmits the power command and the identification information to the video display device 3 (Step S405) and repeats the steps from Step S403.

In a case where the "power" button displayed on the terminal device 1 has not been pressed, the terminal device 1 confirms whether or not a channel setting button of the remote control function has been pressed by the user in Step S406. In a case where the channel setting button, such as a "1" button or a "2" button, displayed on the terminal device 1 has been pressed, the terminal device 1 goes to Step S407, transmits a setting command of the corresponding channel and the identification information to the video display device 3, and repeats the steps from Step S403.

In a case where the channel setting button displayed on the terminal device 1 has not been pressed, the terminal device 1 confirms in Step S408 whether or not setting of a viewing reservation has been instructed. In a case where the setting of the viewing reservation has been instructed, the terminal device 1 sets the viewing reservation to the video display device 3 as instructed, transmits the identification information to the video display device 3 (Step S409), registers the reservation content of the viewing reservation at a date and time of the schedule (Step S412), and repeats the steps from Step S403. The setting of the viewing reservation is achieved by pressing a "program guide" button displayed on the terminal device 1, selecting a desired program from the displayed program guide, and setting the viewing reservation, for example.

In a case where the setting of the viewing reservation has not been instructed, the terminal device 1 confirms in Step S410 whether or not another button has been pressed. The other button is a volume setting button, for example.

In a case where the user has made an instruction of changing the setting of the video display device 3, the terminal device 1 transmits a setting command corresponding to the instruction to the video display device 3 (Step S411), and repeats the steps from Step S403.

Figure 6:
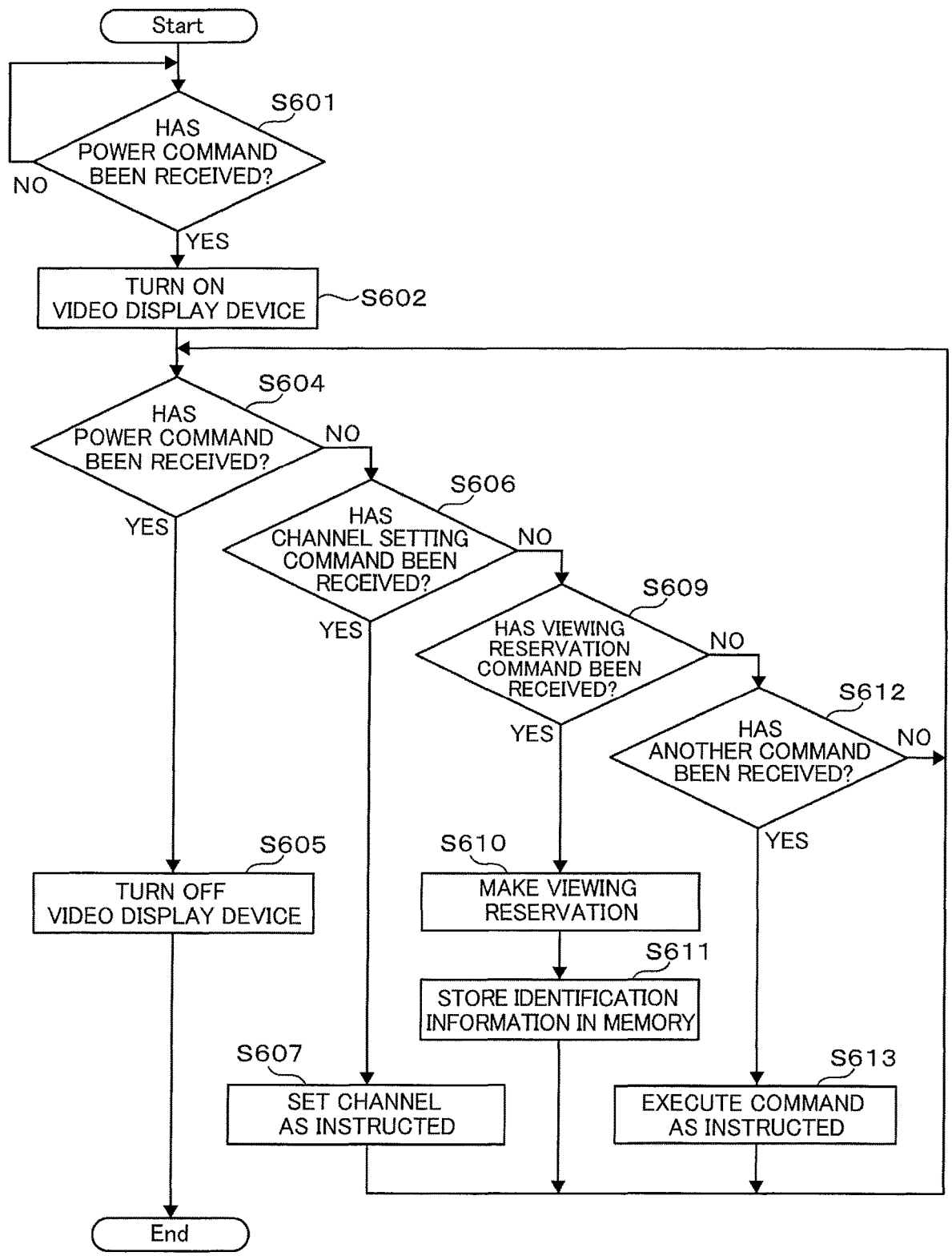
FIG. 6 is an example of a flowchart showing processing by the video display device.

FIG. 6 is a flowchart showing processing by the video display device of the first embodiment of the present invention. This flowchart shows processing when the video display device 3 is subjected to the remote control by the terminal device 1.

In Step S601, the video display device 3 waits for receiving of the power command. Upon receiving the power command, the video display device 3 goes to Step S602 and is turned on.

Then, in Step S604, the video display device 3 confirms whether or not the video display device 3 has received the power command again. In a case where the video display device 3 has received the power command, the video display device 3 goes to Step S605, is turned off to end the processing, and returns again to a state where the video display device 3 waits for the power command (Step S601).

Although the present embodiment shows toggle control, as an example, in which power-on and power-off of the video display device 3 are repeated every time the video display device 3 receives the power command, a power-on command and a power-off command can be separated from each other.

In a case where the video display device 3 has not received the power command in Step S604, the video display device 3 goes to Step S606 and confirms whether or not the video display device 3 has received the channel setting command. In a case where the video display device 3 has received the channel setting command, the video display device 3 goes to Step S607, executes the command as instructed, and repeats the steps from Step S604.

In a case where the video display device 3 has not received the channel setting command in Step S606, the video display device 3 goes to Step S609 and confirms whether or not the video display device 3 has received the viewing reservation command. In a case where the video display device 3 has received the viewing reservation command, the video display device 3 makes a viewing reservation by storing information including a time, a channel, and the like for which the viewing is reserved in the memory 305 (Step S610), further stores the identification information of the terminal device 1 in the memory 305 (Step S611), and repeats the steps from Step S604.

In a case where the video display device 3 has not received the viewing reservation command in Step S609, the video display device 3 goes to Step S612 and confirms whether or not the video display device 3 has received another command. In a case where the video display device 3 has received the other command, the video display device 3 executes the command as instructed (Step S613) and repeats the steps from Step S604. The other command is the volume setting command, for example.

In a case where the video display device 3 has not received the other command, the video display device 3 repeats the steps from Step S604.

Figure 7:
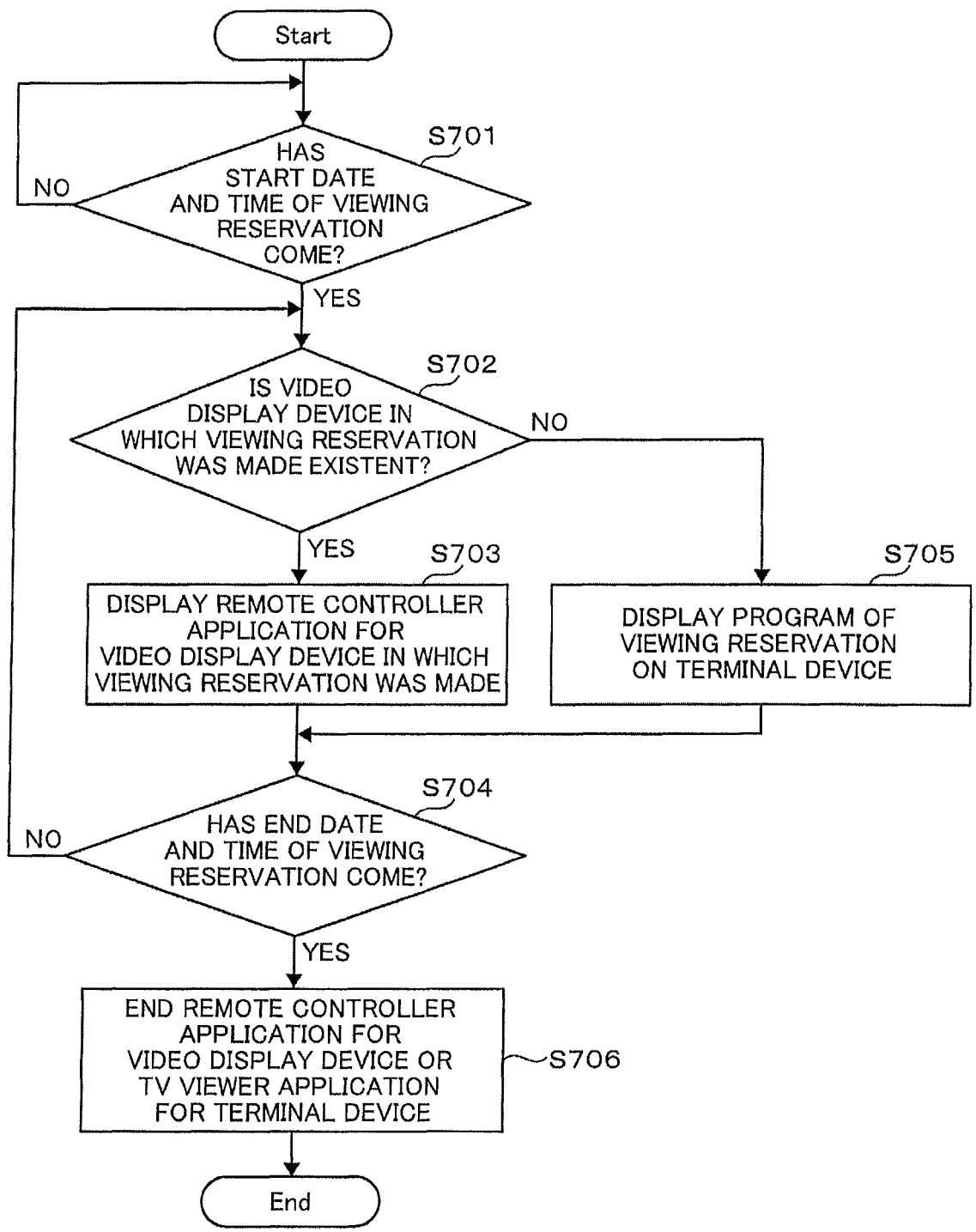
FIG. 7 is an example of a flowchart showing a process of executing a viewing reservation by the terminal device.

FIG. 7 is a flowchart showing a process of executing the viewing reservation by the terminal device of the first embodiment of the present invention. This flowchart shows the execution process by the terminal device 1 when the time of the viewing reservation registered in the scheduler of the terminal device 1 has come.

FIG. 8 show a display example of the scheduler of the terminal device 1 and viewing reservation data of the video display device 3. FIG. 8C shows a display example of viewing reservation data registered in the video display device 3 by the terminal devices 1*a* and 1*b*, FIG. 8A shows a display example of the scheduler registered in the terminal device 1*a* at that time, and FIG. 8B shows a display example of the scheduler registered in the terminal device 1*b* at that time. Since the scheduler manages the user's schedule, a plan, such as a class and a meeting, can also be registered in addition to the viewing reservation, as shown in FIGS. 8A and 8B.

FIG. 8C shows an example in which viewing reservations with reservation numbers 1, 2, . . . , 5 have been made by the terminal devices 1*a* and 1*b*. For example, the reservation number 1 shows a viewing reservation has been made by the terminal device 1*a* for 2012 Music Festival on the terrestrial digital broadcasting channel 4, the start date and time is Nov. 15, 2012, 18:00, and the end date and time is Nov. 15, 2012, 20:00. The reservation number 2 shows that a viewing reservation has been made by the terminal device 1*b* for a weather forecast on the terrestrial digital broadcasting channel 8, the start date and time is Nov. 15, 2012, 18:30, and the end date and time is Nov. 15, 2012, 19:00. This viewing reservation data is stored in the memory 305 of the video display device 3.

FIG. 8A illustrates a portion of the scheduler registered in the terminal device 1*a* showing that the user has an algebra class on Nov. 16, 2012, from 14:00 to 15:00 and a viewing reservation has been made for BS Sports on BS channel 101 on Nov. 16, 2012, from 19:00 to 20:00, for example. This corresponds to the registration number 4 in FIG. 8C, and this scheduler is stored in the memory 205 of the terminal device 1*a*.

FIG. 8B is a portion of the scheduler registered in the terminal device 1b. This scheduler is stored in the memory 205 of the terminal device 1b.

In Step S701 of FIG. 7, the terminal device 1a waits for a start date and time of a viewing reservation, and goes to Step S702 when the start date and time has come. It is assumed here that the start date and time of BS Sports on the aforementioned BS channel 101 has come.

In Step S702, the terminal device 1a switches the process in accordance with whether or not the video display device 3 that has made this viewing reservation is existent nearby.

Whether or not the video display device 3 is existent around the terminal device 1a can be confirmed based on whether or not the terminal device 1a is existent in a communication area of the wireless router 6, for example. Further, more accurate confirmation can be performed by direct communication with the video display device 3 by Wi-Fi Direct.

In a case where the video display device 3 is existent around the terminal device 1a in Step S702, the terminal device 1a goes to Step S703, and starts up and displays the remote controller application for the video display device 3. In this state, the video display device 3 is displaying BS Sports on the aforementioned BS channel 101.

In a case where the video display device 3 is not existent around the terminal device 1a in Step S702, the terminal device 1a goes to Step S705 and displays BS Sports on the aforementioned BS channel 101 for which the viewing reservation has been made. In this state, the video display device 3 is not displaying BS Sports on the aforementioned BS channel 101.

Then, it is confirmed in Step S704 whether or not the end date and time of the viewing reservation has come. In a case where the end date and time of the viewing reservation has come, the terminal device 1a goes to Step S706, and ends the remote controller application for the video display device 3 or a TV viewing application of the terminal device 1, and ends the process. In a case where the end date and time has not come, the terminal device 1a goes back to Step S702 and continues the process. In this manner, the terminal device 1a continues to confirm whether or not the video display device 3 is existent around it until the end date and time of the viewing reservation comes.

Figure 9:
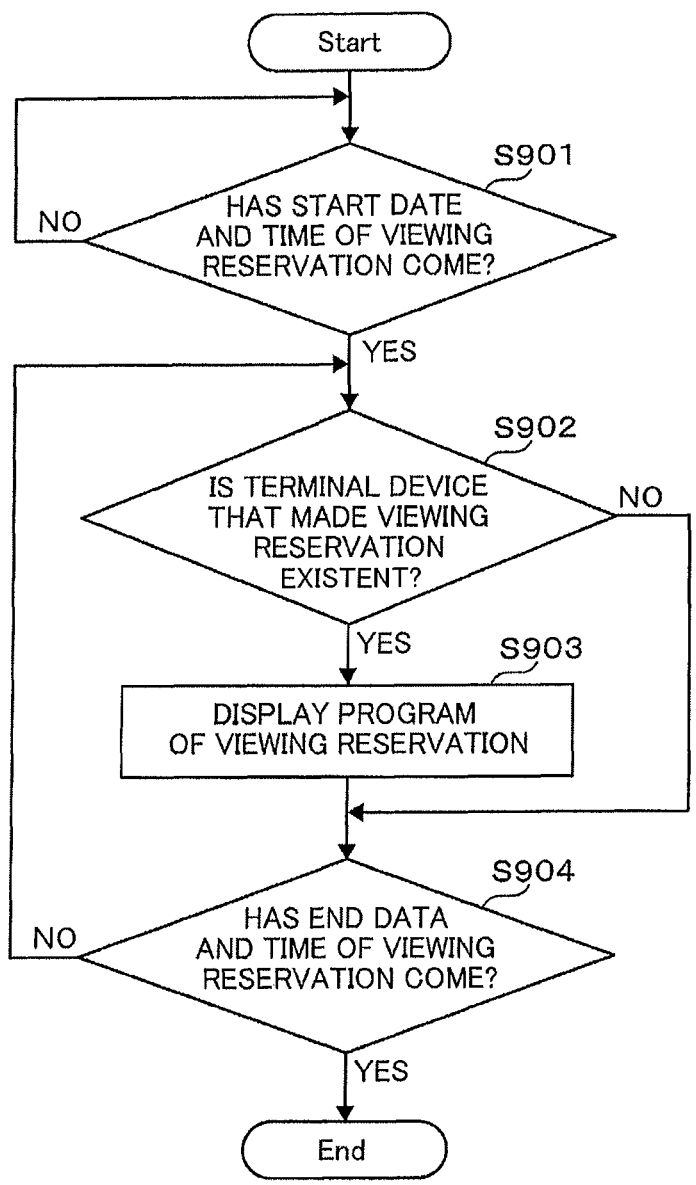
FIG. 9 is an example of a flowchart showing a process of executing the viewing reservation by the video display device.

FIG. 9 is a flowchart showing a process of executing the viewing reservation by the video display device 3. This flowchart shows the execution process by the video display device 3 when the time of the viewing reservation set in the terminal device 1 has come.

In Step S901 of FIG. 9, the video display device 3 waits for the start date and time of the viewing reservation, and goes to Step S902 when the start date and time has come. It is assumed here that the start date and time of the reservation number 4 has come. The reservation number 4 corresponds to the viewing reservation of BS Sports on the aforementioned BS channel 101.

In Step S902, the video display device 3 switches the process in accordance with whether or not the terminal device 1a that has made the viewing reservation with the reservation number 4 is existent around the video display device 3.

Whether or not the terminal device 1a, 1b is existent around the video display device 3 can be confirmed based on whether or not the terminal device 1a, 1b is existent in the communication area of the wireless router 6, for example. Further, more accurate confirmation can be made by direct communication with the video display device 3 by Wi-Fi Direct, for example.

In a case where the terminal device 1a is existent around the video display device 3 in Step S902, the video display device 3 goes to Step S903, and BS Sports on the aforementioned BS channel 101 for which the viewing reservation has been made is displayed on the video display device 3. When the video display device 3 is off, the video display device 3 is turned on. When the video display device 3 is on and is displaying another program, the channel is switched to the channel of BS Sports.

Then, it is confirmed in Step S904 whether or not the end date and time of the viewing reservation with the reservation number 4 has come. When the end date and time of the viewing reservation has come, the video display device 3 ends the process. When the end date and time of the viewing reservation has not come, the video display device 3 goes back to Step S902 and continues the process. In this manner, the video display device 3 continues to confirm whether or not the terminal device 1a is existent around it until the end date and time of the viewing reservation comes.

In a case where the terminal device 1a is not existent around the video display device 3 in Step S902, BS Sports for which the viewing reservation has been made is not displayed on the video display device 3.

In a case where the video display device 3 is off when the viewing reservation starts, the video display device 3 is turned off when ending the process.

In this manner, when the start date and time of the viewing number 4 has come, for example, the program of the reservation number 4 is displayed on the video display device 3 as in the viewing reservation in a case where the terminal device 1a that has made the viewing reservation is existent around the video display device 3. In a case where the terminal device 1a that has made the viewing reservation is not existent around the video display device 3, the program is not displayed on the video display device 3, but is displayed on the terminal device 1a. The program of the reservation number 4 is displayed until the end date and time of the viewing reservation. However, when the terminal device 1a disappears in the middle of the program, the video display device 3 stops this display, and this program starts to be displayed on the terminal device 1a, instead. On the other hand, in a case where the terminal device 1a that has made the viewing reservation is not existent around the video display device 3 at the start date and time of the viewing reservation with the reservation number 4, the program of the reservation number 4 is not displayed on the video display device 3, but is displayed on the terminal device 1a. However, when the terminal device 1a appears in the middle of the display of this program, the display on the terminal device 1a is stopped and the program is displayed on the video display device 3, instead. For example, even if the user of the terminal device 1a cannot arrive at the user's house in which the video display device 3 is installed before the start date and time of the viewing reservation, the user can view the program of the viewing reservation with the terminal device 1a until the user arrives at the house, and can view the rest of the program with the video display device 3 after arriving at the house. Also, even if the user moves away from the user's house when being viewing of the program of the viewing reservation with the video display device 3, the user can view the rest with the terminal device 1a.

Figure 10A:
FIG. 10A shows a display example of the screen of the terminal device.

The terminal device 1a may display a notification immediately before the start date and time of the viewing reservation in a case where the video display device 3 is existent around it. This reminds the user in the house thereof of the viewing reservation. FIG. 10A shows a display example of an operation screen of the video display device 3 at that time.

Figure 10B:
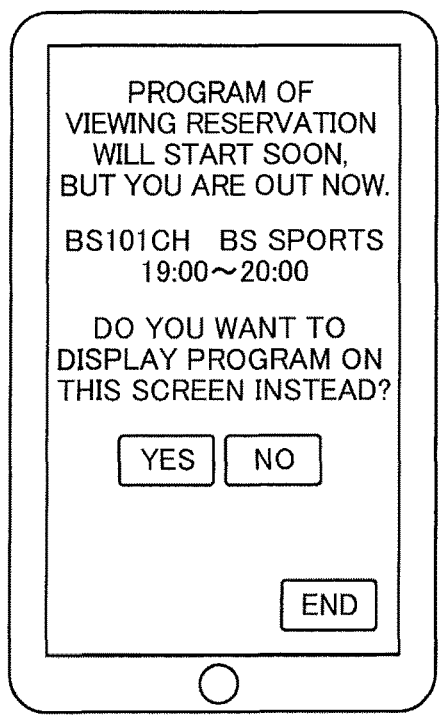
FIG. 10B shows a display example of the screen of the terminal device.

Further, in a case where the video display device 3 is not existent nearby, the user can determine whether or not to display the program of the viewing reservation on the terminal device 1a. This allows the user to select whether or not the user views the program outside the house. FIG. 10B shows a display example of the operation screen of the video display device 3 at that time.

In the present embodiment, an example is described in which the viewing reservation is registered in the scheduler of the terminal device when the viewing reservation is made in the video display device. Also, when reservations of various types of events, that is, operation reservations can be made in consumer electronics other than the video display device, e.g., an air conditioner and a rice cooker, the viewing reservation may also be registered in the scheduler of the terminal device. Then, by displaying a notification on the terminal device before a cooling operation of the air conditioner starts, for example, the user can be reminded of the operation reservation of the air conditioner. Further, it is possible to start an operation of the air conditioner and display a remote controller application on the terminal device in a case where this terminal device is existent around the air conditioner at the time of the operation reservation of the air conditioner, and is possible to not start the air conditioner in a case where this terminal device is not existent around the air conditioner. Furthermore, it is possible to remind the user of a reservation of rice cooking by displaying a completion indication after completion of the rice cooking by the rice cooker, for example.

In the present embodiment, an example including two terminal devices is described. However, the same operation can be performed also in a case of three or more terminal devices.

With the aforementioned configuration, when the viewing reservation is made in the video display device from the terminal device, the viewing reservation is also registered in the scheduler of the terminal device in the video display device from the terminal device in the first embodiment of the present invention. It is possible to remind the user of the viewing reservation by displaying a notice on the terminal device immediately before the start of the viewing reservation. In a case where this terminal device is existent around the video display device at the time of the viewing reservation, the program of the viewing reservation is displayed on the video display device and the remote controller application is displayed on the terminal device. In a case where this terminal device is not existent around the video display device at the time of the viewing reservation, the program of the viewing reservation is displayed on the terminal device. The user can select whether or not the program is displayed on the terminal device.

Further, it is possible to switch a display destination even in the middle of the program of the viewing reservation in accordance with whether or not the terminal device is existent around the video display device. Thus, it is possible to execute the viewing reservation of the video display device only while the user who has made the viewing reservation is existent around the video display device, and to prevent the video display device from displaying the program irrespective of the absence of the user who has made the reservation. Furthermore, because the viewing reservation is executed by the terminal device while the user who has made the viewing reservation is not existent around the video display device, the user who has made the reservation can view the program with the terminal device.

Second Embodiment

FIG. 11 is a flowchart showing a process of executing a viewing reservation by a terminal device of the second embodiment of the present invention. This flowchart shows the execution process by the terminal device 1 when the time of the viewing reservation registered in the terminal device 1 has come.

Steps S1101 to S1106 are the same as Steps S701 to S706 in FIG. 7.

In Step S1101, the terminal device 1 waits for the start date and time of the viewing reservation, and goes to Step S1102 when the start date and time has come. It is assumed here that, in FIG. 8B showing the scheduler of the terminal device 1b, the start date and time of the weather forecast on the terrestrial digital broadcasting channel 8 (Nov. 15, 2012, 18:30) has come.

In a case where the video display device 3 is existent around the terminal device 1b in Step S1102, the terminal device goes to Step S1107, and switches the process in accordance with whether or not the video display device 3 is displaying the weather forecast on the aforementioned terrestrial digital broadcasting channel 8, that is, whether or not the video display device 3 is executing the viewing reservation.

In a case where the video display device 3 is executing the viewing reservation or waits for execution of the viewing reservation, the terminal device 1b goes to Step S1103, and starts up and displays the remote controller application for the video display device 3.

In a case where the video display device 3 is not executing the viewing reservation or does not wait for execution of the viewing reservation, the terminal device 1b goes to Step S1105, and displays the weather forecast on the aforementioned terrestrial digital broadcasting channel 8 for which the viewing reservation has been made.

In FIG. 8C showing the viewing reservation data of the video display device 3, the weather forecast on the aforementioned terrestrial digital broadcasting channel 8 of the reservation number 2 overlaps 2012 Music Festival on the terrestrial digital broadcasting channel 4 with the reservation number 1 in time. In a case where the terminal device 1a that has made the viewing reservation with the reservation number 1 is existent around the video display device 3, the video display device 3 is displaying 2012 Music Festival on the terrestrial digital broadcasting channel 4 of the reservation number 1. Instead, the terminal device 1b displays the weather forecast on the aforementioned terrestrial digital broadcasting channel 8. In a case where the terminal device 1a that has made the viewing reservation with the reservation number 1 is not existent around the video display device 3, the video display device 3 is displaying the weather forecast on the aforementioned terrestrial digital broadcasting channel 8 of the reservation number 2. The terminal device 1b starts up an operation application for the video display device 3 and displays thereon.

It can be found whether or not the video display device 3 is executing that viewing reservation, by making the video display device 3 notify the terminal device 1 of which viewing reservation is being executed now, for example. Further, this can also be found by inputting a video and an audio output from the video display device 3 from the video input unit 207 and the audio input unit 208 of the terminal device 1, and comparing them with a video and an audio of a program received by the terminal device 1.

With the above configuration, the same effects as those in the first embodiment can be obtained in the second embodiment of the present invention.

In addition, in a case where a viewing reservation in the video display device is not executed because of an overlap of viewing reservations and a program of the viewing reservation is not displayed on the video display device, the program of the viewing reservation is displayed on the terminal device in place of the video display device. Therefore, the user who has made the viewing reservation can view the program with the terminal device.

Third Embodiment

Figure 12:
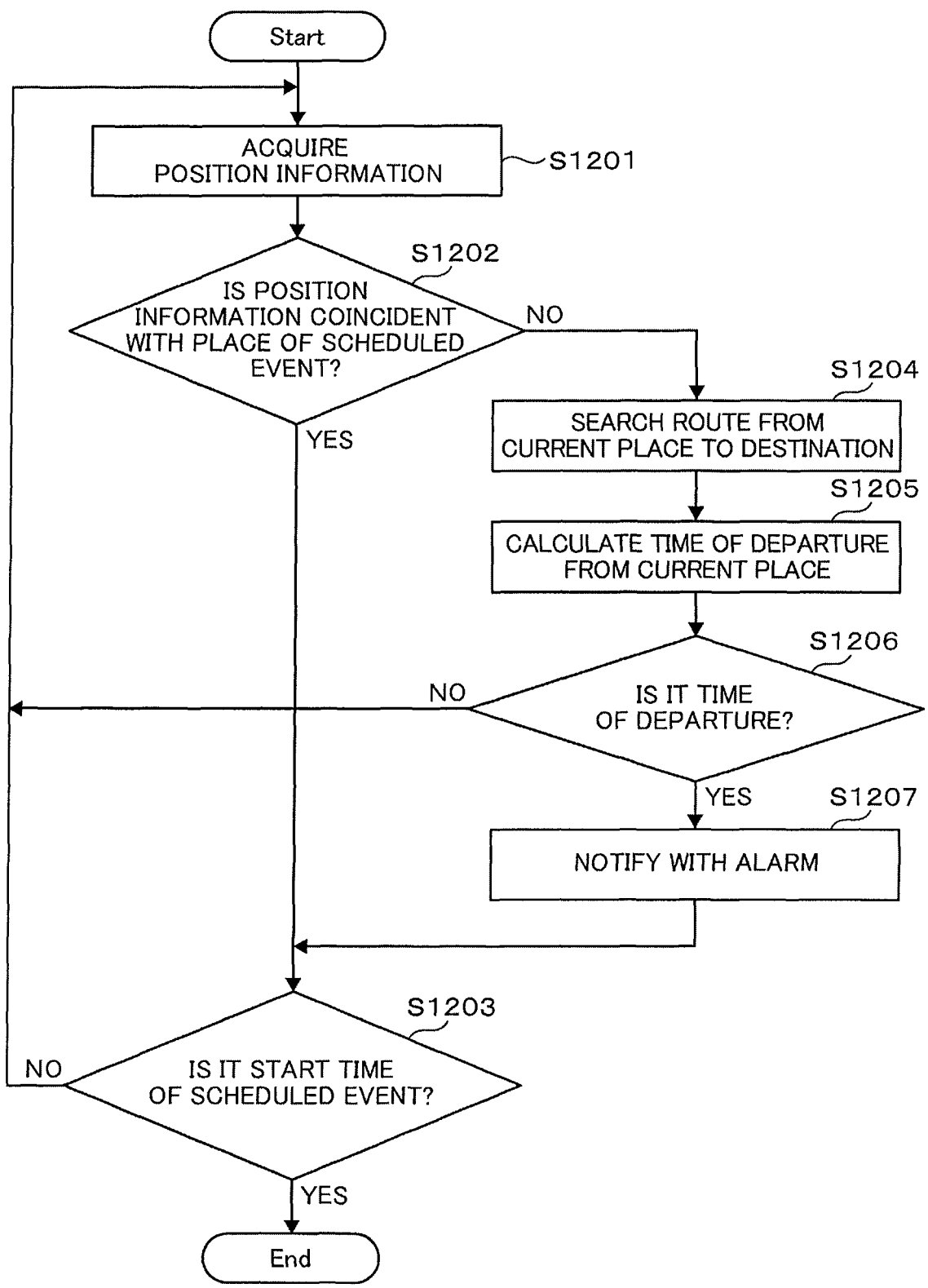
FIG. 12 is an example of a flowchart showing a process of notification of a scheduled event by the terminal device.

FIG. 12 is a flowchart showing a process of notification of a scheduled event by the terminal device in the third embodiment of the present invention. This flowchart shows an alarm notification process before a start time of an event scheduled in the scheduler of the terminal device 1 comes. The event may be a viewing reservation or any other events, e.g., a meeting and a dinner.

In Step S1201, the terminal device 1 acquires current position information. The position information is acquired by using a GPS or Wi-Fi, for example.

Then, the terminal device 1 switches the process in Step S1202 in accordance with whether or not the acquired position information of the terminal device 1 is coincident with position information of a destination, that is, a place where the scheduled event is performed. In a case where the scheduled event is a viewing reservation, the destination is a place where the video display device 3 is installed. The position information of the video display device 3 is registered in advance in the terminal device 1. For example, in a case where the video display device 3 is installed in the user's house, position information of the user's house can be registered.

When the position information of the terminal device 1 and that of the place of the scheduled event are coincident, that is, the user is in the user's house in a case where the scheduled event is a viewing reservation, the terminal device 1 goes to Step S1203, and confirms whether or not the start time of the scheduled event has come. When the start time of the scheduled event has come, the terminal device 1 ends the process. When the start time of the scheduled event has not come, the terminal device 1 goes back to Step S1201, and continues the process.

When the position information of the terminal device 1 and that of the place of the scheduled event are not coincident in Step S1202, that is, the user is not in the user's house in a case where the scheduled event is a viewing reservation, the terminal device 1 goes to Step S1204, searches a traveling route to the destination from the position information of the current position of the terminal device 1, and calculates a traveling time. In a case where a plurality of routes are found, the user may select one, or one may be selected based on a history.

Then, the terminal device 1 calculates a time of departure from the current place from the start date and time of the scheduled event and a required time of traveling in Step S1205, and switches the process in Step S1206 in accordance with whether or not the calculated time of departure has come. When the time of departure has come, the terminal device 1 goes to Step S1207, and notifies the user with an alarm or the like. When the time of departure has not come, the terminal device 1 goes back to Step S1201, and continues the process.

In this manner, the terminal device 1 continues to confirm whether or not the user has arrived at the place where the scheduled event is performed until the start time of the scheduled event comes, and, in a case where the user has not arrived at the place of the scheduled event, notifies the user of the time of departure that enables the user to be in time for the start time of the scheduled event. In other words, in a case where the scheduled event is a viewing reservation, the destination is the user's house, for example. In this case, the terminal device 1 continues to confirm whether or not the user is in the user's house until the start date and time of the viewing reservation comes, and notifies the user of a time to start heading for home for enabling the user to be in time for the start date and time of the viewing reservation, when the user is not in the user's house.

With the above configuration, in a case where the user who has made the reservation in the scheduler has not arrived at the place where the scheduled event is performed, the terminal device searches the traveling route from the current position, and notifies the user of the time of departure for enabling the user to be in time for the start time of the scheduled event in the third embodiment of the present invention. Therefore, the user who has made the reservation can surely perform the scheduled event. In a case where the scheduled event is a viewing reservation, when the user who has made the viewing reservation is not existent around the video display device, the terminal device searches the route from the current position for the user to head for home, and notifies the user of the time to start heading for home that enables the user to be in time for the start time of the viewing reservation. Therefore, the user who has made the viewing reservation can surely view the program with the video display device.

Fourth Embodiment

Figure 13:
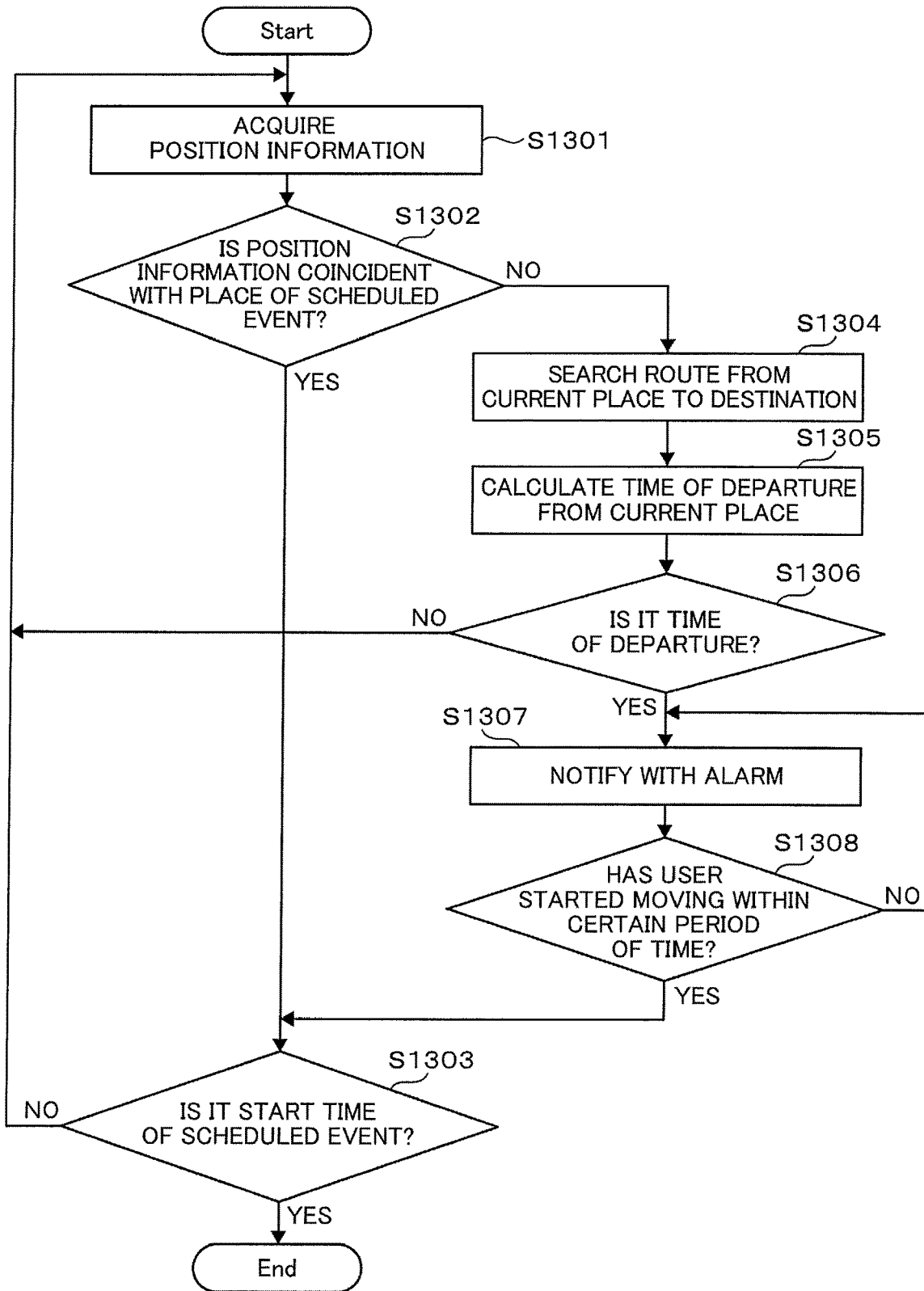
FIG. 13 is an example of the flowchart showing the process of the notification of the scheduled event by the terminal device.

FIG. 13 is a flowchart showing a process of notification of a scheduled event by the terminal device in the fourth embodiment of the present invention. This flowchart shows an alarm notification process before a start time of an event scheduled in the scheduler of the terminal device 1 comes. The event may be a viewing reservation or any other events, e.g., a meeting and a dinner.

Steps S1301 to S1306 are the same as Steps S1201 to S1206 in FIG. 12.

When the time of departure has come in Step S1306, the terminal device 1 goes to Step S1307 and notifies the user with an alarm or the like, and then goes to Step S1308 and switches the process in accordance with whether or not the position information of the terminal device 1 has changed within a predetermined period of time, that is, whether or not the user has started traveling within the predetermined period of time. In a case where the user has not started traveling within the predetermined period of time, the terminal device 1 goes back to Step S1307 and notifies again the user with the alarm or the like. In a case where the user has started traveling within the predetermined period of time, the terminal device 1 goes to Step S1303 and confirms whether or not the start time of the scheduled event has come. When the start time of the scheduled event has come, the terminal device 1 ends the process. When the start time of the scheduled event has not come, the terminal device 1 goes back to Step S1301 and continues the process.

With the above configuration, the same effects as those in the third embodiment can be obtained in the fourth embodiment of the present invention.

Further, in a case where the user who has made the reservation in the scheduler has not arrived at the place where the scheduled event is performed, the terminal device searches the traveling route from the current position and, in a case where the user has not started traveling even after the notification of the start time for enabling the user to be in time for the start time of the scheduled event, notifies the user again. Therefore, the user who has made the reservation can surely perform the scheduled event. In a case where the scheduled event is a viewing reservation, when the user who has made the viewing reservation is not existent around the video display device, the terminal device searches the route from the current position for the user's return home. In a case where the user has not started traveling even after the notification of the start time for enabling the user to be in time for the start date and time of the viewing reservation, the terminal device notifies the user again. Therefore, the user who has made the viewing reservation can surely view the program of the viewing reservation with the video display device.

Fifth Embodiment

Figure 14:
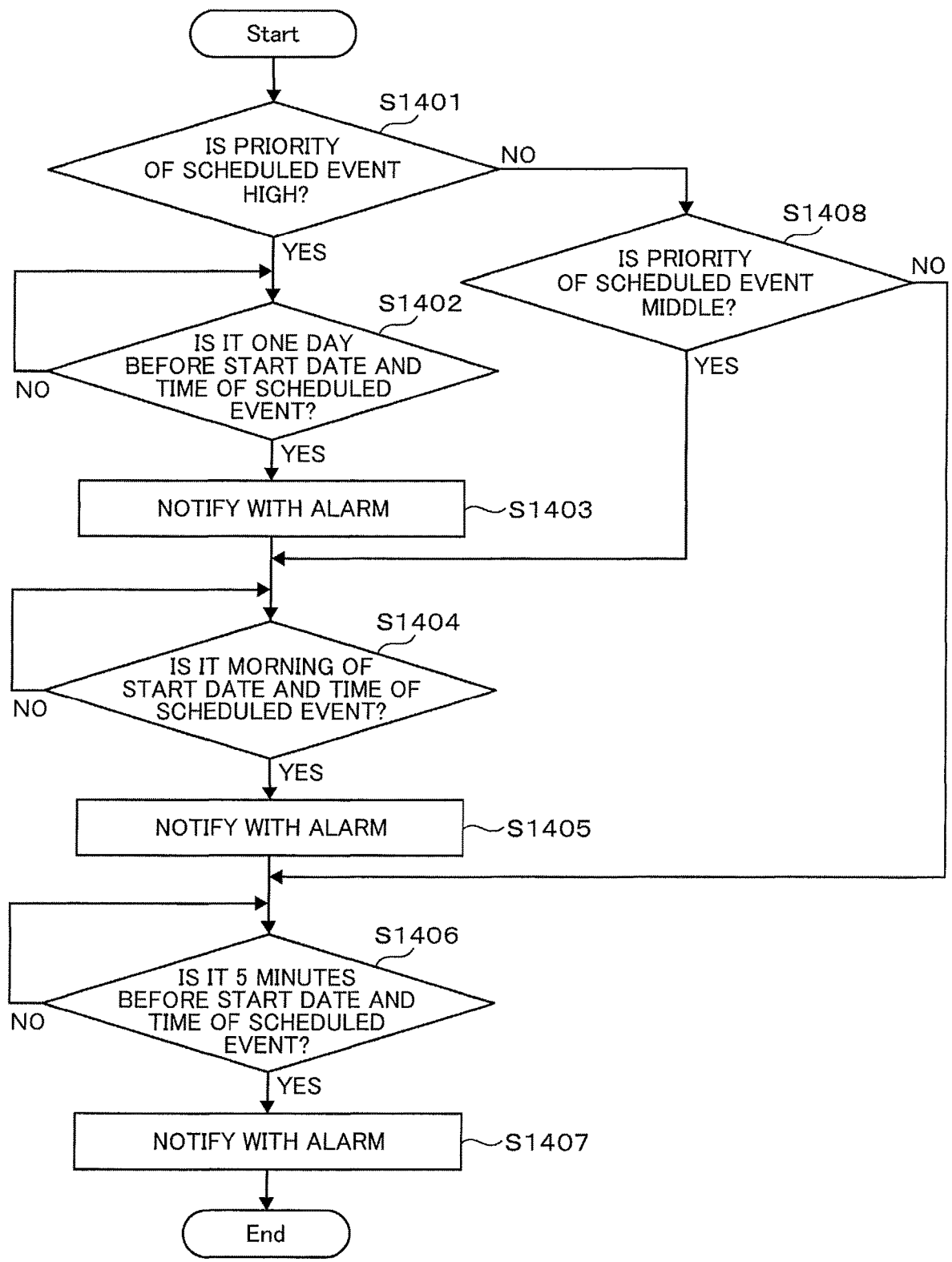
FIG. 14 is an example of the flowchart showing the process of the notification of the scheduled event by the terminal device.

FIG. 14 is a flowchart showing a process of a notification of a scheduled event by the terminal device in the fifth embodiment of the present invention. This flowchart shows an alarm notification process before a start time of an event scheduled in the scheduler of the terminal device 1 comes. The event may be a viewing reservation or any other events, e.g., a meeting and a dinner.

In the present embodiment, the alarm notification process is switched in accordance with the priority of the scheduled event. The priority is registered in advance for every scheduled event. Alternatively, the priority may be registered in advance for every genre of events. It is assumed here that there are three levels of priorities including a high level, a middle level, and a low level.

In a case where the priority of the scheduled event is high in Step S1401, the terminal device 1 goes to Step S1402. At a certain time, e.g., 10:00 am, in the day before the scheduled event, the terminal device 1 goes to Step S1403 and notifies the user with an alarm or the like.

Then, at a certain time, e.g., 10:00 am, in the day of the scheduled event in Step S1404, the terminal device 1 goes to Step S1405 and notifies the user with the alarm or the like.

Then, at a certain time, e.g., 5 minutes before the start time of the scheduled event in Step S1406, the terminal device 1 goes to Step S1407 and notifies the user with the alarm or the like.

When the priority of the scheduled event is not high in Step S1401, the terminal device 1 goes to Step S1408. When the priority of the scheduled event is middle, the terminal device 1 goes to Step S1404. When the priority of the scheduled event is not middle, that is, is low, the terminal device 1 goes to Step S1406.

In this manner, the terminal device 1 notifies the user with the alarm or the like three times, i.e., in the day before the scheduled event, in the day of the scheduled event, and at a time slightly before the start of the scheduled event in a case where the priority of the scheduled event is high. In a case where the priority of the scheduled event is middle, the terminal device 1 notifies the user with the alarm or the like twice, i.e., in the day of the scheduled event and at the time slightly before the start of the scheduled event. In a case where the priority of the scheduled event is low, the terminal device 1 notifies the user with the alarm or the like once, i.e., at the time slightly before the start of the viewing reservation.

Although an example of using three levels of priority is described, the number of levels of priority may be two or four, or any number. Further, although an example is described in which the number of times of the notification to the user with the alarm or the like is 3, 2, and 1 depending on the priorities, the number of times of the notification may be 4, 3, and 1 or 5, 2, and 1, or may be any number.

In the fifth embodiment of the present application, the terminal device switches the alarm notification process in accordance with the priority of the scheduled event with the above configuration. Therefore, the user can surely perform various types of events as in the reservations in the scheduler. In a case where the scheduled event is a viewing reservation, the terminal device switches the alarm notification process in accordance with the priority of the viewing reservation. Therefore, the user who has made the viewing reservation can surely view the program with the video display device.

Sixth Embodiment

Figure 15:
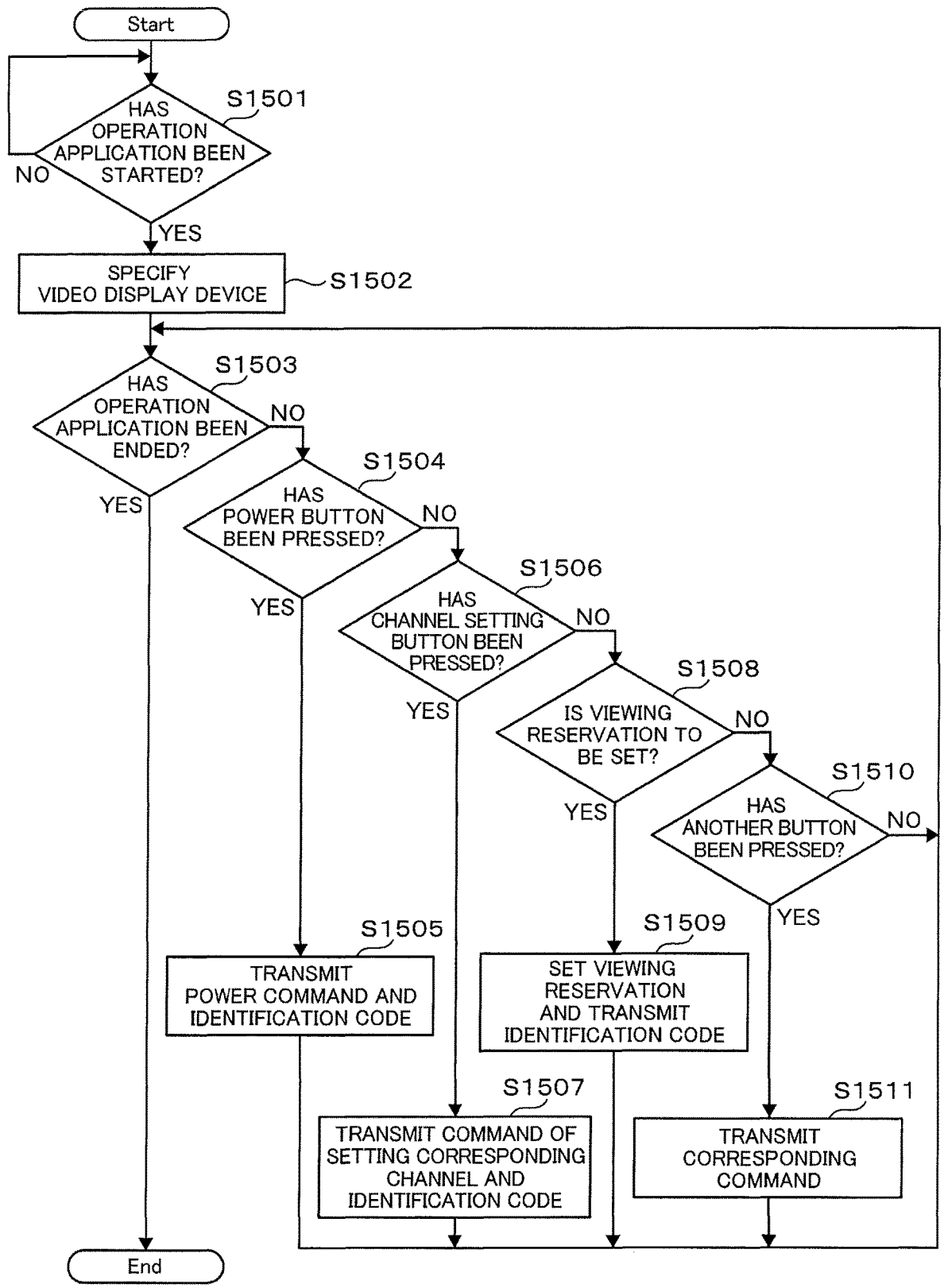
FIG. 15 is an example of the flowchart showing the processing by the terminal device.

FIG. 15 is a flowchart showing processing by the terminal device 1 in the sixth embodiment of the present invention. This flowchart shows processing when the terminal device 1 performs the remote control for the video display device 3.

In Step S1501, the terminal device 1 waits for startup of application software for performing the remote control for the video display device 3 (hereinafter, referred to as an "operation application") based on an operation by the user.

FIG. 5 show various display examples of the touch-panel type display 202 of the terminal device 1. The terminal device 1 can perform various functions by starting various types of application software. FIG. 5A illustrates a menu screen in which various types of application software are arranged on the terminal device 1. When the user presses the "remote controller" button displayed in the touch panel, the aforementioned remote controller application is started up.

In Step S1502, the terminal device 1 selects the video display device 3 as an object of the remote control based on an operation by the user. FIG. 5B shows a display example of a selection screen in a case where there are two video display devices 3 that can be selected as the object of the remote control. It is assumed here that "TV A" is selected.

When the video display device 3 as the object of the remote control is selected, the terminal device 1 displays various instructions that can be transmitted to the video display device 3. FIG. 5C shows a display example of an operation screen of the video display device 3 at that time.

Then, in Step S1503, the terminal device 1 confirms whether or not the user has performed an operation for ending the operation application. When the operation for ending the operation application, e.g., pressing of the "end" button displayed on the terminal device 1 has been performed, the terminal device 1 returns to the step of displaying the menu screen.

In Step S1504, the terminal device 1 confirms whether or not the power button has been pressed by the user. In a case where the "power" button displayed on the terminal device 1 has been pressed, the terminal device 1 transmits the power command and the identification information to the video display device 3 (Step S1505), and repeats the steps from Step S1503.

In a case where the "power" button displayed on the terminal device 1 has not been pressed, the terminal device 1 confirms in Step S1506 whether or not the channel setting button of the remote control function has been pressed by the user. In a case where the channel setting button, such as a "1" button or a "2" button, displayed on the terminal device 1 has been pressed, the terminal device 1 goes to Step S1507, transmits the setting command of the corresponding channel and the identification information to the video display device 3, and repeats the steps from Step S1503.

In a case where the channel setting button displayed on the terminal device 1 has not been pressed, the terminal device 1 confirms in Step S1508 whether or not setting of a viewing reservation has been instructed. In a case where the setting of the viewing reservation has been instructed, the terminal device 1 sets the viewing reservation to the video display device 3 as instructed, transmits the identification information to the video display device 3 (Step S1509), and repeats the steps from Step S1503.

In a case where the setting of the viewing reservation has not been instructed, the terminal device 1 confirms in Step S1510 whether or not another button has been pressed. The other button is a volume setting button, for example.

In a case where the user has made an instruction of changing the setting of the video display device 3, the terminal device 1 transmits a setting command corresponding to the instruction to the video display device 3 (Step S1511), and repeats the steps from Step S1503.

FIG. 16 is a flowchart showing processing by the video display device in the sixth embodiment of the present invention. This flowchart shows processing when the video display device 3 is subjected to the remote control by the terminal device 1.

In Step S1601, the video display device 3 waits for receipt of the power command. Upon receiving the power command, the video display device 3 goes to Step S1602 and is turned on. In Step S1603, the video display device 3 stores the identification information at the time of receipt of the power command in the memory 305. It is assumed here that the video display device 3 has received the identification information of the terminal device 1*a*.

Then, in Step S1604, the video display device 3 confirms whether or not the video display device 3 has received the power command again. Upon receiving the power command, the video display device 3 goes to Step S1605, is turned off, and ends the process.

The present embodiment shows toggle control in which power-on and power-off of the video display device 3 are repeated every time the video display device 3 receives the power command as an example. However, a power-on command and a power-off command can be separated from each other.

In a case where the video display device 3 has not received the power command in Step S1604, the video display device 3 goes to Step S1606, and confirms whether or not the video display device 3 has received the channel setting command. In a case where the video display device 3 has received the channel setting command, the video display device 3 goes to Step S1607 and executes the command as instructed.

Then, in Step S1608, the video display device 3 confirms whether or not the identification information at the time of receipt of the channel setting command is coincident with the identification information stored in the memory 305. When they are coincident, the video display device 3 repeats the steps from Step S1604.

When they are not coincident, the video display device 3 stores the identification information in the memory 305 (Step S1609) and repeats the steps from Step S1604. It is assumed here that the video display device 3 has received the identification information of the terminal device 1*b*.

In a case where the video display device 3 has not received the channel setting command in Step S1606, the video display device 3 goes to Step S1610, and confirms whether or not the video display device 3 has received the viewing reservation command. In a case where the video display device 3 has received the viewing reservation command, the video display device 3 makes a viewing reservation by storing information including a time, a channel, and the like of the viewing reservation in the memory 305 (Step S1611), further stores the identification information of the terminal device 1 in the memory 305 (Step S1609), and repeats the steps from Step S1604.

In a case where the video display device 3 has not received the viewing reservation command in Step S1610, the video display device 3 goes to Step S1612 and confirms whether or not the video display device 3 has received another command. In a case where the video display device 3 has received another command, the video display device 3 executes the command as instructed (Step S1613), and repeats the steps from Step S1604. The other command is the volume setting command, for example.

In a case where the video display device 3 has not received the other command, the video display device 3 repeats the steps from Step S1604.

Figure 17:
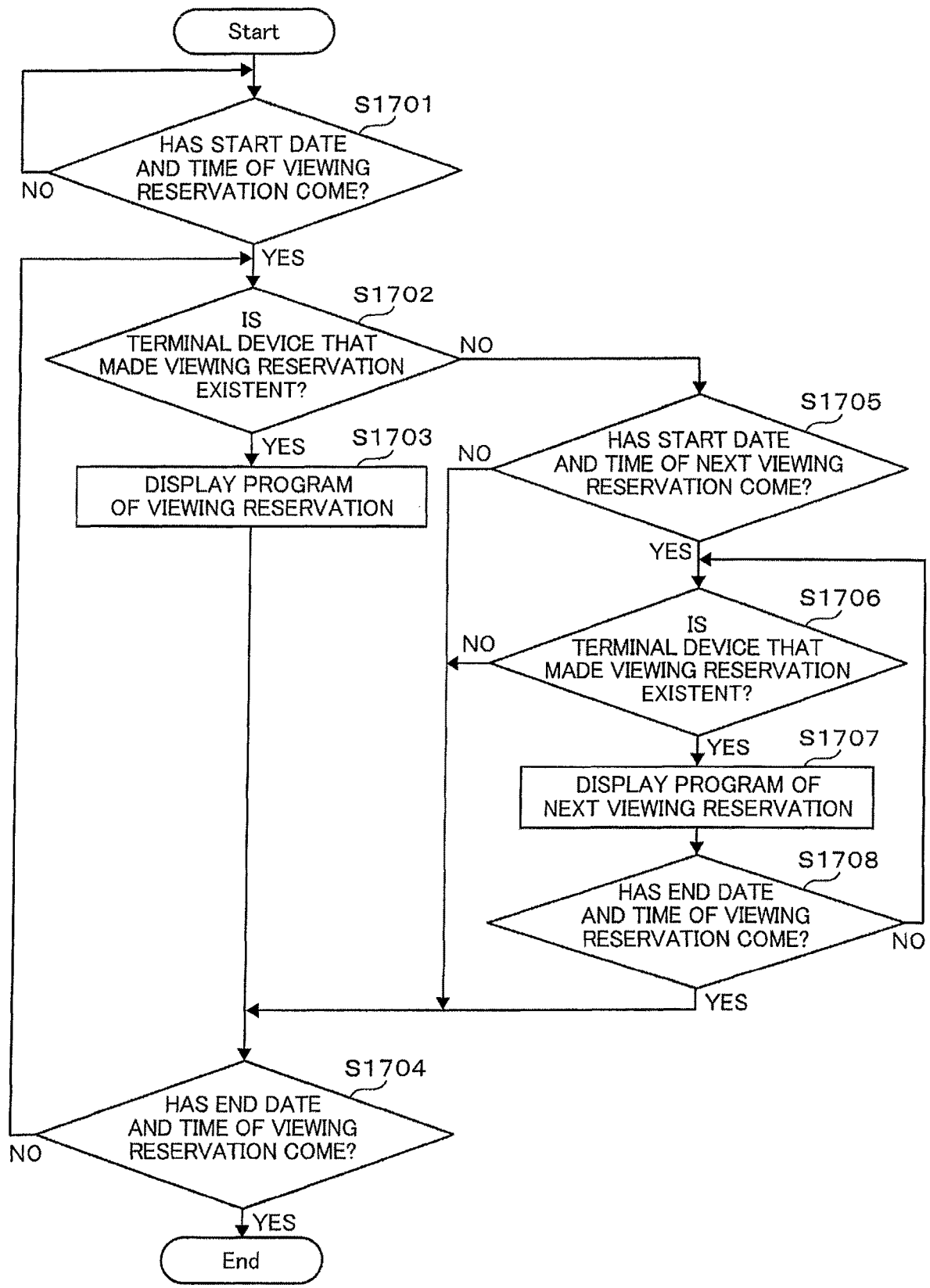
FIG. 17 is an example of the flowchart showing the process of executing the viewing reservation by the video display device.

FIG. 17 is a flowchart showing a process of executing the viewing reservation by the video display device in the sixth embodiment of the present invention. This flowchart shows the execution process by the video display device 3 when the time of the viewing reservation set in the terminal device 1 has come.

FIG. 18 shows a structure example of viewing reservation data stored in the memory 305 of the video display device 3.

The viewing reservation data shows an example in which viewing reservations with reservation numbers 1, 2, 3, . . . , 5 have been made by the terminal device in that order. For example, the reservation number 1 shows that a viewing reservation has been made for a program 1 by the terminal device 1*a*, the program 1 is broadcast on the terrestrial digital broadcasting channel 4, the start date and time is Nov. 15, 2012, 18:00, and the end date and time is Nov. 15, 2012, 20:00. Further, the reservation number 2 shows that a viewing reservation has been made for a program 2 by the terminal device 1*b*, the program 2 is broadcast on the terrestrial digital broadcasting channel 8, the start date and time is Nov. 15, 2012, 18:30, and the end date and time is Nov. 15, 2012, 19:00.

In Step S1701 of FIG. 17, the video display device 3 waits for the start date and time of the viewing reservation, and goes to Step S1702 when the start date and time has come. It is assumed here that the start date and time of the reservation number 1 has come.

In Step S1702, the video display device 3 switches the process in accordance with whether or not the terminal device 1*a* that has made the viewing reservation with the reservation number 1 is existent around the video display device 3.

Whether or not the terminal device 1*a*, 1*b* is existent around the video display device 3 can be confirmed based on whether or not the terminal device 1*a*, 1*b* is existent in the communication area of the wireless router 6, for example. Further, more accurate confirmation can be performed by direct communication with the video display device 3 by Wi-Fi Direct.

In a case where the terminal device 1*a* is existent around the video display device 3 in Step S1702, the video display device 3 goes to Step S903, and displays the program 1 for which the viewing reservation has been made on the video display device 3. When the video display device 3 is displaying another program, the other program is switched to the program 1.

Then, it is confirmed in Step S1704 whether or not the end date and time of the viewing reservation with the reservation number 1 has come. When the end date and time of the viewing reservation has come, the video display device 3 ends the process. When the end date and time of the viewing reservation has not come, the video display device 3 goes back to Step S1702 and continues the process. In this manner, the video display device 3 continues to confirm whether or not the terminal device 1a is existent around it until the end date and time of the viewing reservation comes.

In a case where the terminal device 1a is not existent around the video display device 3 in Step S1702, the video display device 3 goes to Step S1705, and confirms whether or not the start date and time of the next viewing reservation has come. The video display device 3 goes to Step S1704 when the start date and time of the next viewing reservation has not come, but goes to Step S1706 when it has come. It is assumed here that the start date and time with the reservation number 2 has come.

Then, in Step S1706, the video display device 3 switches the process in accordance with whether or not the terminal device 1b that has made the viewing reservation with the reservation number 2 is existent around the video display device 3.

In a case where the terminal device 1b is not existent around the video display device 3, the video display device 3 goes to Step S1704. In a case where the terminal device 1b is existent, the video display device 3 goes to Step S1707, and displays the program 2 for which the viewing reservation has been made on the video display device 3. When the video display device 3 is displaying another program, the other program is switched to the program 2.

Then, it is confirmed in Step S1708 whether or not the end date and time of the viewing reservation with the reservation number 2 has come. When the end date and time of the viewing reservation has come, the video display device 3 ends the process and goes to Step S1704. When the end date and time has not come, the video display device 3 goes back to Step S1706 and continues the process. In this manner, the video display device 3 continues to confirm whether or not the terminal device 1b is existent around it until the end date and time of the viewing reservation comes.

In this manner, at the start date and time of the viewing reservation with the reservation number 1, for example, the program 1 is displayed on the video display device 3 as in the viewing reservation in a case where the terminal device 1a that has made the viewing reservation is existent around the video display device 3, but is not displayed in a case where the terminal device 1a is not existent. Although the program 1 is displayed until the end date and time of the viewing reservation, the display on the video display device 3 is switched to the program 2 in a case where the terminal device 1a disappears in the middle of the program 1 and, at the start date and time of the next viewing reservation, the terminal device 1b that has made the viewing reservation is existent around the video display device 3. After the switching to the program 2, the program 2 is not switched to the program 1 even when the terminal device 1a appears again. However, after the program 2 ends, the program 2 is switched to the program 1.

Although an example including two terminal devices is described, the same operation can also be performed in a case of three or more terminal devices.

In the sixth embodiment of the present invention, with the above configuration, the program for which the viewing reservation has been made is displayed on the video display device in a case where the terminal device that has made the viewing reservation is existent around the video display device, but is not displayed in a case where the terminal device is not existent. When an overlap of viewing reservations occurs, the priority is given to one of the viewing reservations for which a program starts to be displayed first. However, when the terminal device that has made the viewing reservation for the program displayed first disappears around the video display device, that program is switched to a program of the next viewing reservation. In this manner, the viewing reservation is executed only while the user who has made that viewing reservation is existent around the video display device. Therefore, it is possible to prevent viewing by another user from being disturbed irrespective of the absence of the user who has made the viewing reservation.

Seventh Embodiment

Figure 19:
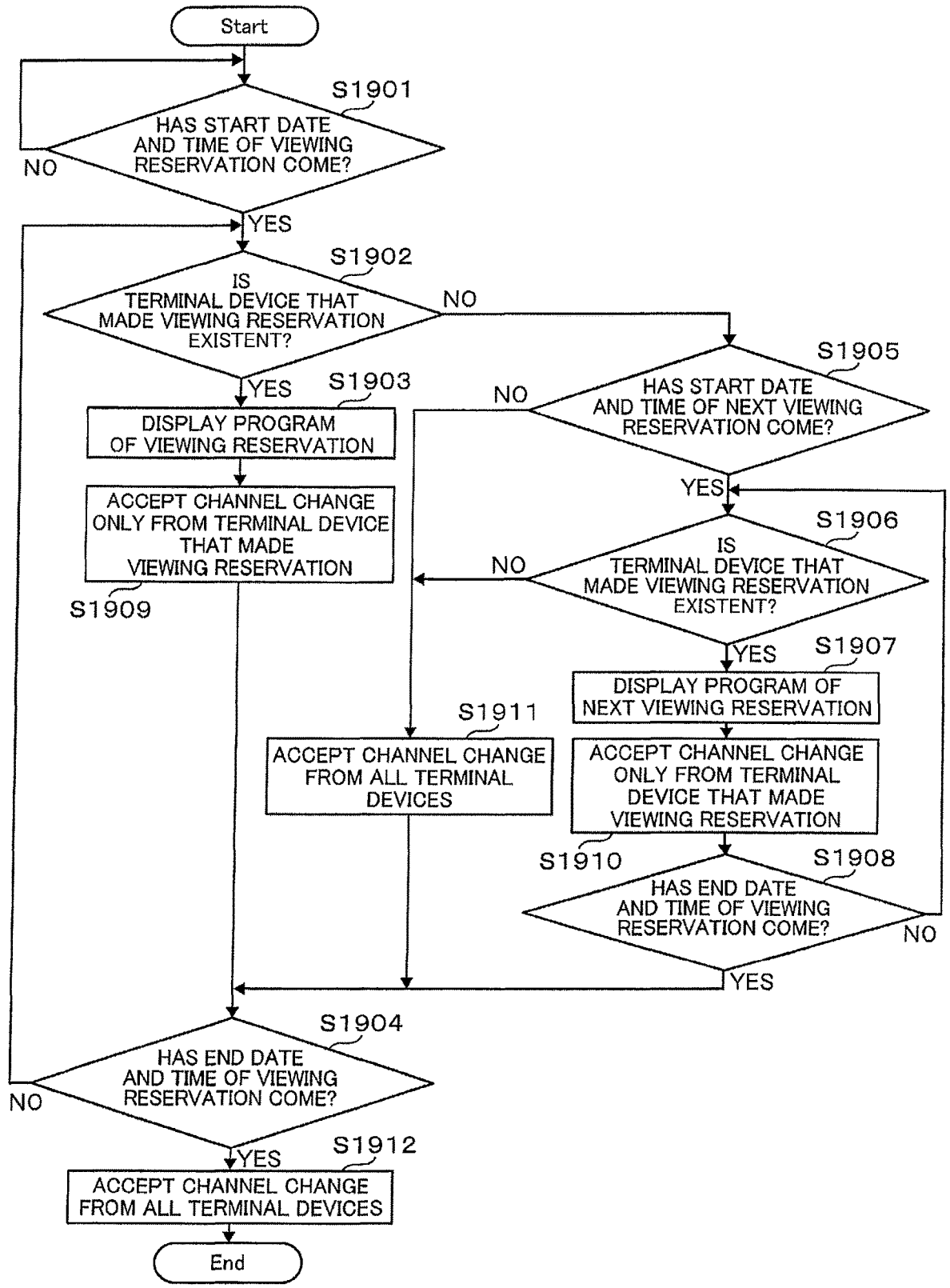
FIG. 19 is an example of the flowchart showing the process of executing a viewing reservation by the video display device.

FIG. 19 is a flowchart showing a process of executing a viewing reservation by the video display device in the seventh embodiment of the present invention.

Steps S1901 to S1908 are the same as Steps S1701 to S1708 in FIG. 17 and therefore the description thereof is omitted.

A program 1 for which a viewing reservation has been made in the video display device 3 is displayed in Step S1903, and thereafter the video display device 3 goes to Step S1909, so that the video display device 3 accepts a channel change from the terminal device 1a that has made the viewing reservation only, but does not accept the channel change from another terminal device 1 (e.g., the terminal device 1b).

Also, a program 2 of the next viewing reservation is displayed on the video display device 3 in Step S1907, and thereafter the video display device 3 goes to Step S1910, so that the video display device 3 accepts the channel change from the terminal device 1b that has made the viewing reservation only, but does not accept the channel change from another terminal device 1 (e.g., the terminal device 1a).

In a case where the start date and time of the next viewing reservation has not come in Step S1905, or in a case where the terminal device 1b that has made the viewing reservation with the reservation number 2 is not existent around the video display device 3 in Step S1906 even if the start data and time of the next viewing reservation has come, the video display device 3 goes to Step S1911, so that the video display device 3 accepts the channel change from all the terminal devices.

Further, when the end date and time of the viewing reservation with the reservation number 1 has come in Step S1904, the video display device 3 then goes to Step S1912, so that the video display device 3 accepts the channel change from all the terminal devices 1, and thereafter ends the process.

In this manner, when the start date and time of the viewing reservation with the reservation number 1 has come, for example, the program 1 is displayed on the video display device 3 as in the viewing reservation in a case where the terminal device 1a that has made the viewing reservation is existent around the video display device 3. The program 1 is not displayed in a case where the terminal device 1a is not existent. In a case where the program 1 is displayed, the channel can be changed from the terminal device 1a only. However, when the terminal device 1a disappears in the middle of the program 1, the channel change can be performed from all the terminal devices 1 thereafter. Then, when the start date and time of the next viewing reservation has come, the program displayed on the video display device 3 is switched to the program 2 in a case where the terminal device 1b that has made the viewing reservation is existent around the video display device 3. In a case where the program 2 is displayed, the channel can be changed from the terminal device 1b only. After the program 1 or 2 is finished, the channel change can be performed from all the terminal devices 1.

With the above configuration, the same effects as those in the sixth embodiment can be obtained in the seventh embodiment of the present invention.

Further, during the process of executing the viewing reservation, the channel can be changed only from the terminal device that has made the viewing reservation. Therefore, the user who has made the viewing reservation can freely change the channel, while it is possible to prevent the channel change by another user irrespective of the viewing reservation by that user irrespective that the user has made the viewing reservation.

Eighth Embodiment

FIG. 20 is a flowchart showing processing by the terminal device 1 in the eighth embodiment of the present invention. This flowchart shows processing when the terminal device 1 performs the remote control for the video display device 3.

Steps S2001 to S2011 are the same as Steps S1501 to S1511 in FIG. 15 and therefore the description thereof is omitted.

In Step S2006, the terminal device 1 confirms whether or not the channel setting button of the remote control function has been pressed by the user. In a case where the channel setting button, such as a "1" button or a "2" button, displayed on the terminal device 1 has been pressed, the terminal device 1 goes to Step S2012 and confirms whether or not the terminal device 1 is in an emergency disaster mode. In a case where the terminal device 1 is not in the emergency disaster mode, the terminal device 1 goes to Step S2007, transmits a command of setting the corresponding channel and the identification information thereof to the video display device 3, and repeats the steps from Step S2003. The emergency disaster mode is set when the terminal device 1 has received emergency disaster information, for example. The emergency disaster information may include an emergency earthquake alert, an emergency lightning alert, an emergency fire alert, an emergency tsunami alert, an emergency typhoon alert, an emergency heavy rain alert, an emergency river flood alert, an emergency eruption alert, and the like.

In a case of the emergency disaster mode, the terminal device 1 goes to Step S2013, transmits the command of setting the corresponding channel and an emergency code to the video display device 3, and repeats the steps from Step S2003.

Figure 21:
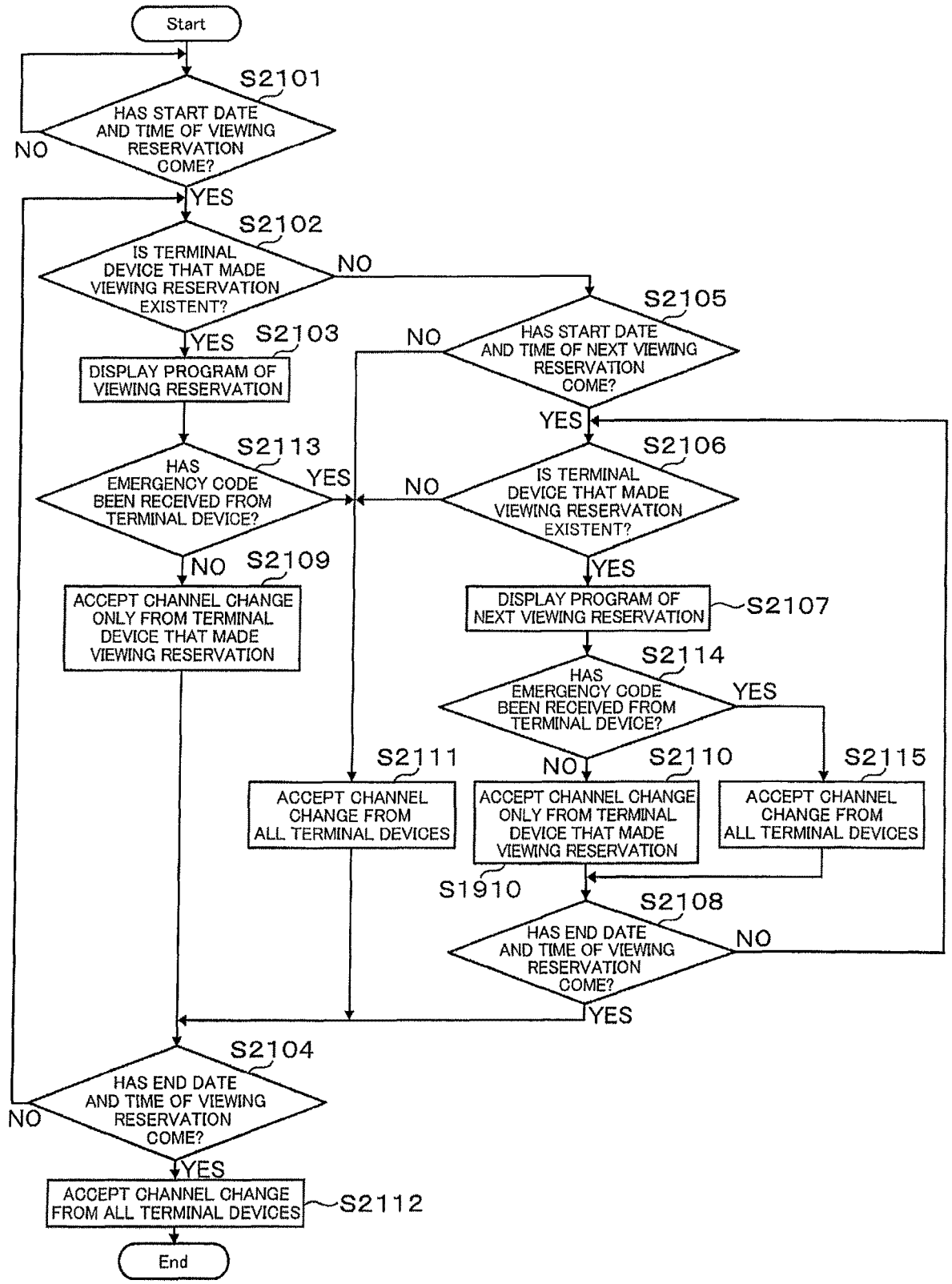
FIG. 21 is an example of the flowchart showing the process of executing the viewing reservation by the video display device.

FIG. 21 is a flowchart showing a process of executing the viewing reservation by the video display device 3 in the eighth embodiment of the present invention.

Steps S2101 to S2108 are the same as Steps S1701 to S1708 in FIG. 17 and therefore the description thereof is omitted.

Steps S2109 to S2112 are the same as Steps S1909 to S1912 in FIG. 18 and therefore the description thereof is omitted.

A program 1 for which a viewing reservation has been made is displayed on the video display device 3 in Step S2103, and thereafter the video display device 3 goes to Step S2113 and switches the process in accordance with whether or not the emergency code has been transmitted from the terminal device. In a case where the emergency code has been transmitted from the terminal device, the video display device 3 goes to Step S2111, so that in a case where a channel change occurs, the video display device 3 accepts it from all the terminal devices.

In a case where the emergency code has not been transmitted from the terminal device, the video display device 3 goes to Step S2109, so that in a case where the channel change occurs, the video display device 3 accepts it only from the terminal device 1a that has made the viewing reservation, but does not accept from another terminal device 1 (e.g., the terminal device 1b).

Further, a program 2 for which the next viewing reservation has been made is displayed on the video display device 3 in Step S2107, and thereafter the video display device 3 goes to Step S2114 and switches the process in accordance with whether or not the emergency code has been transmitted from the terminal device. In a case where the emergency code has been transmitted from the terminal device, the video display device 3 goes to Step S2115, so that in a case where the channel change occurs, the video display device 3 accepts it from all the terminal devices.

In a case where the emergency code has not been transmitted from the terminal device, the video display device 3 goes to Step S2110, so that in a case where the channel change occurs, the video display device 3 accepts it only from the terminal device 1b that has made the viewing reservation, but does not accept from another terminal device 1 (e.g., the terminal device 1a).

In this manner, when the start date and time of the viewing reservation with the reservation number 1 has come, for example, the program 1 is displayed on the video display device 3 as in the viewing reservation in a case where the terminal device 1a that has made the viewing reservation is existent around the video display device 3, but is not displayed in a case where the terminal device 1a is not existent. In a case where the program 1 is displayed, the channel change can be performed from the terminal device 1a only. However, in a case where the emergency code has been transmitted from the terminal device 1, the channel can be changed from all the terminal devices. Alternatively, in a case where the terminal device 1b that has made the viewing reservation is existent around the video display device 3 and displays the program 2, the channel can be changed from the terminal device 1b only. However, in a case where the emergency code has been transmitted from the terminal device 1, the channel can be changed from all the terminal devices.

Although an example in which the video display device 3 receives the emergency code from the mobile terminal 1 is described, the video display device 3 may receive the emergency disaster information.

With the above configuration, the same effects as those in the seventh embodiment can be obtained in the eighth embodiment of the present invention.

Further, although the channel can be changed only from the terminal device that has made the viewing reservation during the process of executing the viewing reservation, the channel change can be performed from all the terminal devices in emergency situations.

Ninth Embodiment

Figure 22:
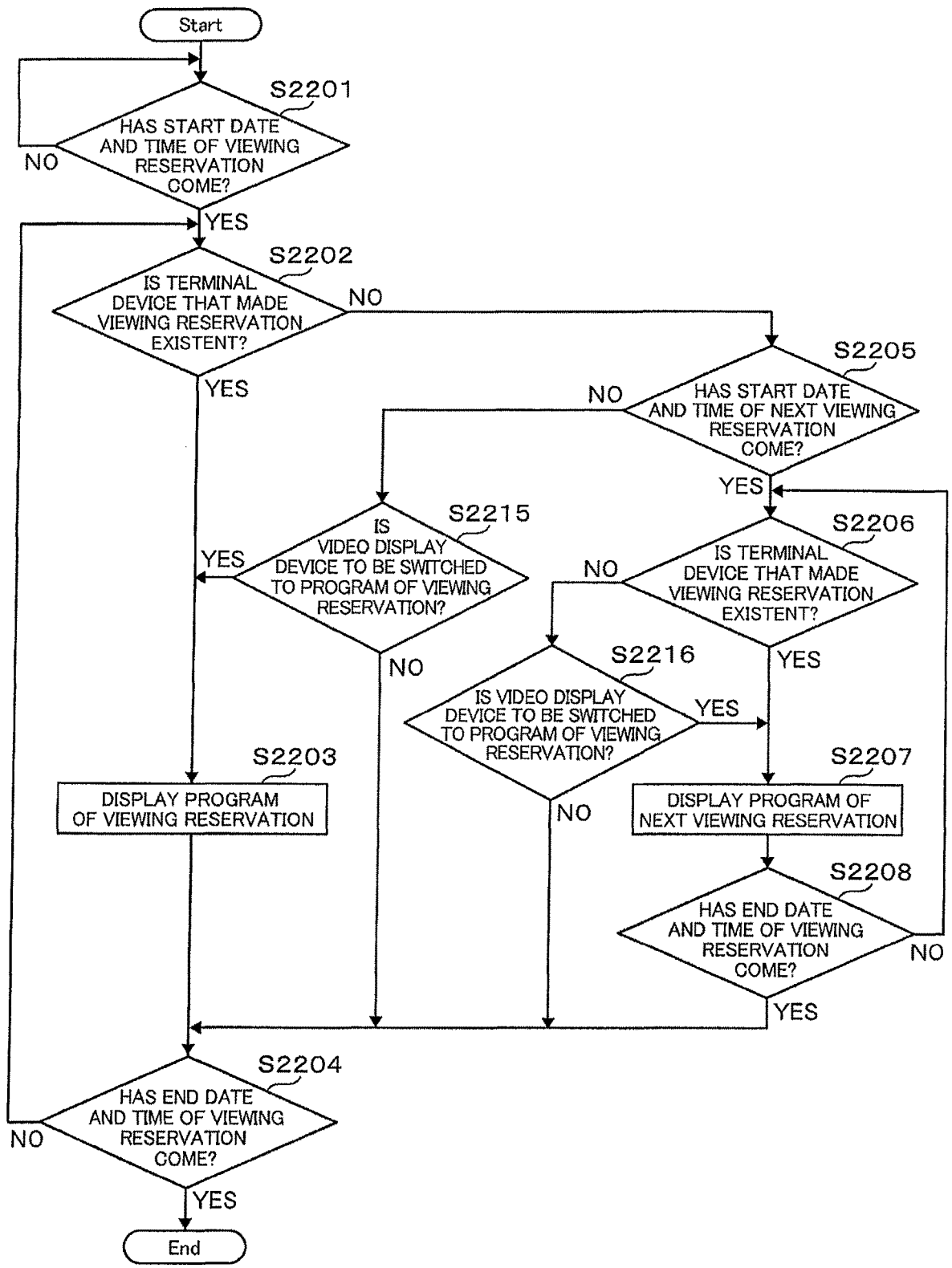
FIG. 22 is an example of the flowchart showing the process of executing the viewing reservation by the video display device.

FIG. 22 is a flowchart showing a process of executing a viewing reservation by the video display device in the ninth embodiment of the present invention.

Steps S2201 to S2208 are the same as Steps S1701 to S1708 in FIG. 17 and therefore the description thereof is omitted.

In a case where the start date and time of the reservation number 1 has come in Step S2201 and the terminal device 1a that has made the viewing reservation with the reservation number 1 is not existent around the video display device 3 in Step S2202, the video display device 3 confirms in Step S2205 whether or not the start date and time of the next viewing reservation has come. In a case where the start date and time of the next viewing reservation has not come, the video display device 3 goes to Step S2215 and makes the currently viewing user select whether to perform switching to the program 1 for which the viewing reservation has been made. For example, a question is displayed on the display 302 of the video display device 3, and an answer from the terminal device 1 is accepted. Alternatively, the question may be displayed on the display 202 of the terminal device 1 around the video display device 3. Alternatively, the question may be displayed on the display 202 of the terminal device 1 that has turned on the video display device 3 or has switched the channel of the video display device 3. In a case where the user has selected to perform the switching, the video display device 3 goes to Step S2203 and displays the program 1 for which the viewing reservation has been made on the video display device 3. In a case where the switching has not been selected, the video display device 3 goes to Step S2204.

In a case where the start date and time of the next viewing reservation has come in Step S2205 and the terminal device 1b that has made the viewing reservation with the reservation number 2 is not existent around the video display device 3 in Step S2206, the video display device 3 goes to Step S2216, and makes the currently viewing user to select whether to perform switching to the program 2 for which the viewing reservation has been made. In a case where the user has selected to perform the switching, the video display device 3 goes to Step S2207, and displays the program 1 for which the viewing reservation has been made on the video display device 3. In a case where the switching has not been selected, the video display device 3 goes to Step S2204.

In a case where no answer has been received to the question whether to perform the switching to the program for which the viewing reservation has been made within a certain period of time, the switching of the program is not performed. After the switching to the program 1 or 2 for which the viewing reservation has been made in Step S2215 or S2216, no question is issued to the user.

In this manner, when the start date and time of the viewing reservation with the reservation number 1 has come, for example, the program 1 is displayed on the video display device 3 as in the viewing reservation, in a case where the terminal device 1a that has made the viewing reservation is existent around the video display device 3. In a case where the terminal device 1a is not existent, the currently viewing user can select whether or not to perform switching to the program 1. Similarly, when the start date and time of the viewing reservation with the reservation number 2 has come, the program 2 is displayed on the video display device 3 as in the viewing reservation, in a case where the terminal device 1b that has been made the viewing reservation is existent around the video display device 3. In a case where the terminal device 1b is not existent, the currently viewing user can select whether to perform switching to the program 2.

With the above configuration, the same effects as those in the sixth embodiment can be obtained in the ninth embodiment of the present invention.

Further, even when the terminal device that has made the viewing reservation is not existent around the video display device, the viewing reservation can be executed if the currently viewing user selects. In this manner, even if the user who has made the reservation is absent, another user can view the program for which the viewing reservation has been made if the other user would like to do so.

Tenth Embodiment

Figure 23:
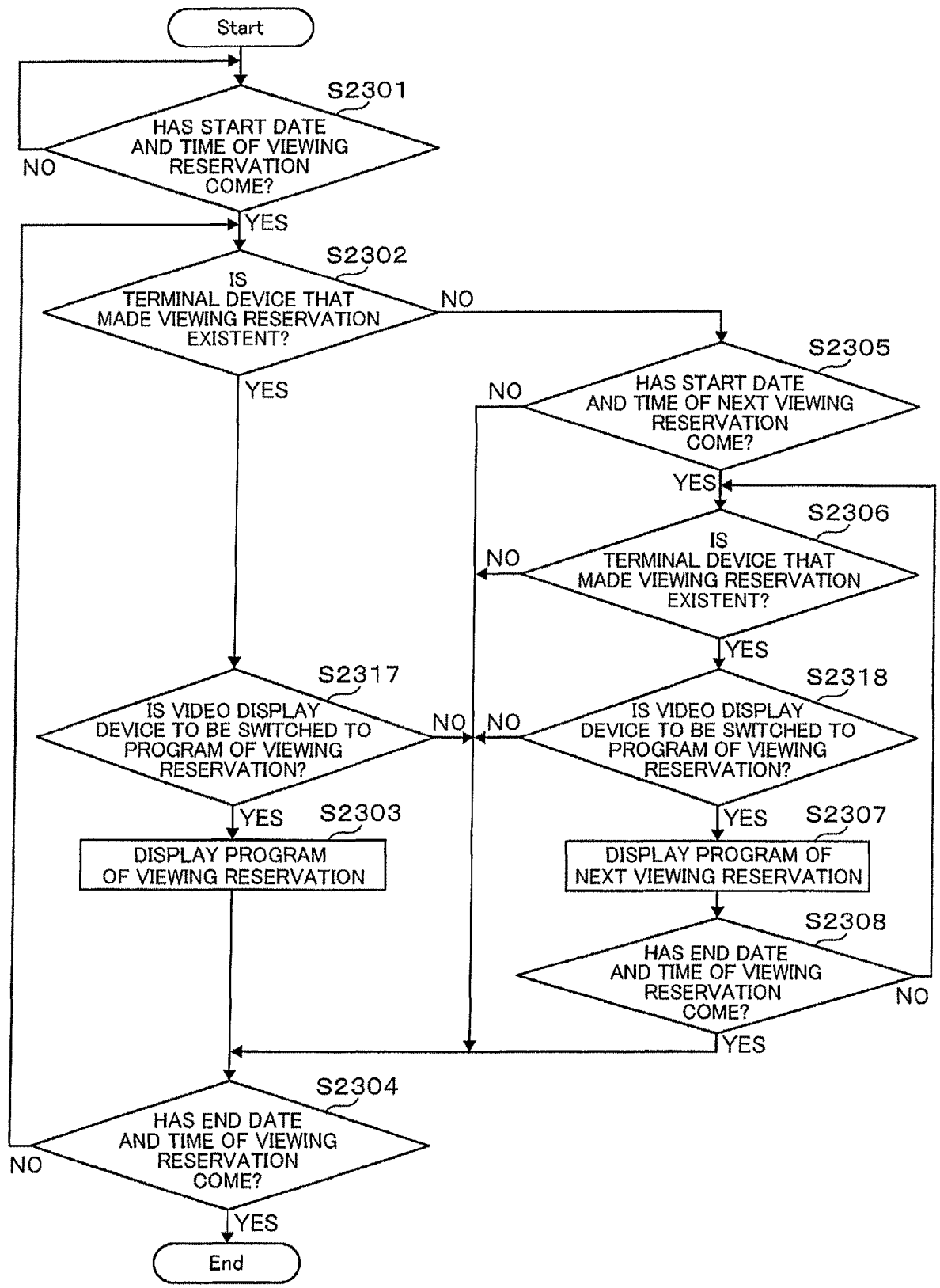
FIG. 23 is an example of the flowchart showing the process of executing the viewing reservation by the video display device.

FIG. 23 is a flowchart showing a process of executing a viewing reservation by the video display device in the tenth embodiment of the present invention.

Steps S2301 to S2308 are the same as Steps S1701 to S1708 in FIG. 17 and therefore the description thereof is omitted.

In a case where the start date and time of the reservation number 1 has come in Step S2301 and the terminal device 1a that has made the viewing reservation with the reservation number 1 is existent around the video display device 3 in Step S2302, the video display device 3 goes to Step S2317 and asks the user of the terminal device 1a a question whether to perform switching to the program 1 for which the viewing reservation has been made. The question is displayed on the display 302 of the video display device 3, and only an answer from the terminal device 1a is accepted. Alternatively, the question may be displayed on the display 202 of the terminal device 1a. In a case where the user of the terminal device 1a has selected the switching, the video display device 3 goes to Step S2303, and displays the program 1 of the viewing reservation on the video display device 3. In a case where the switching has not been selected, the video display device 3 goes to Step S2304.

In a case where the start date and time of the next viewing reservation has come in Step S2305 and the terminal device 1b that has made the viewing reservation with the reservation number 2 is existent around the video display device 3 in Step S2306, the video display device 3 goes to Step S2318, and makes the user of the terminal device 1b select whether or not to perform switching to the program 2 for which the viewing reservation has been made. For example, a question is displayed on the display 302 of the video display device 3, and only an answer from the terminal device 1b is accepted. Alternatively, the question may be displayed on the display 202 of the terminal device 1a. In a case where the user of the terminal device 1b has selected the switching, the video display device 3 goes to Step S2307, and displays the program 2 for which the viewing reservation has been made on the video display device 3. In a case where the switching has not been selected, the video display device 3 goes to Step S2304.

In a case where no answer has been received within a certain period of time to the question whether or not to perform the switching to the program for which the viewing reservation has been made, the switching to the program is performed. After the switching to the program 1 or 2 for which the viewing reservation has been made, no question is issued to the user even when the video display device 3 goes to Step S2317 or S12318 again.

In this manner, in a case where, at the start date and time of the viewing reservation with the reservation number 1, for example, the terminal device 1a that has made the viewing reservation is existent in the video display device 3, only the user of the terminal device 1a can select whether or not to perform switching to the program 1. Similarly, when the terminal device 1b that has made the viewing reservation with the reservation number 2 is existent around the video display device 3 at the start date and time of that viewing reservation, only the user of the terminal device 1b can select whether to perform switching to the program 2.

With the above configuration, the same effects as those in the sixth embodiment can be obtained in the tenth embodiment of the present invention.

Further, it is possible for the terminal device that has made the viewing reservation to select and view one of the program that is currently being viewed and the program of the viewing reservation.

Eleventh Embodiment

FIG. 24 is a block diagram showing a configuration of a video display device 240.

A control unit 250, a signal receiver 241, a display 242, an audio output unit 243, an infrared communication unit 244, a memory 245, and a LAN communication unit 246 are equivalent to the control unit 300, the signal receiver 301, the display 302, the audio output unit 303, the infrared communication unit 304, the memory 305, and the LAN communication unit 306 of the video display device 3 of FIG. 3, respectively, and therefore the description thereof is omitted.

A video input unit 247 is a camera, and converts light input from a lens into an electric signal, thereby inputting image data of surroundings or an object thereto. An audio input unit 248 is a microphone, and converts a user's voice or the like into audio data and input it thereto. A short-range wireless communication unit 249 performs short-range wireless communication by Bluetooth, for example, to input/output various types of data. A GPS receiver 251 is a component that can receive electric waves from a satellite to detect the position of the video display device 240 on the Earth.

Note that the short-range wireless communication unit 249 includes a coding circuit, a decoding circuit, an antenna, and the like, and the GPS receiver 251 includes a decoding circuit, an antenna, and the like.

As in the sixth embodiment, when the terminal device 1a that has made the viewing reservation with the reservation number 1 is existent around the video display device 240 at the start date and time of the viewing reservation, for example, the program 1 is displayed on the video display device 240 as in the viewing reservation. When the terminal device 1a is not existent, the program 1 is not displayed. The program 1 is displayed until the end date and time of the viewing reservation. However, when the terminal device 1a disappears in the middle of the program 1 and, at the start date and time of the next viewing reservation, the terminal device 1b that has made the viewing reservation is existent around the video display device 240, the display on the video display device 240 is switched to the program 2. After the switching to the program 2, the program 2 is not switched to the program 1 even when the terminal device 1a appears again. However, after the program 2 ends, the program 2 is switched to the program 1.

Whether or not the terminal device 1a, 1b is existent around the video display device 240 can be confirmed based on whether or not the terminal device 1a, 1b is existent in a communication area of a LAN such as Wi-Fi, for example.

Alternatively, this confirmation can be achieved by detecting the position of each of the terminal devices 1a and 1b and the video display device 240 by means of the GPS receiver 210 of the terminal device 1a, 1b and the GPS receiver 251 of the video display device 240. While transmission of GPS information from the terminal device 1a, 1b to the video display device 240 is set to be permitted in advance, the video display device 240 compares the GPS information transmitted from the terminal device 1a, 1b with the GPS information thereof to determine whether or not the terminal device 1a, 1b is existent around it.

Alternatively, the above confirmation can be achieved by the short-range wireless communication unit 29 of the terminal device 1a, 1b and the short-range wireless communication unit 249 of the video display device 240. It is determined whether or not the terminal device 1a, 1b is existent around the video display device 240, based on whether or not the terminal device 1a, 1b is existent in a short-range wireless communication range of the video display device 240.

Alternatively, the above confirmation can be achieved by face detection using the video input unit 247 of the terminal device 1a, 1b. The face of the user of the terminal device 1a, 1b is captured by the video input unit 247 of the video display device 240 in advance and is stored in the memory 245 in association with the terminal device 1a, 1b. Then, the video display device 240 captures an image around it at the date and time of the viewing reservation to perform face detection, and determines whether or not the terminal device 1a, 1b is existent around it, based on whether detected face information is coincident with the face information stored in the memory 245.

Especially, the confirmation using the face detection can allow accurate determination whether or not the user is viewing the video display device. Therefore, it is also possible to perform accurate determination even in a case where the user is in another room and forgets the viewing reservation.

With the above configuration, the same effects as those in the sixth embodiment can be obtained in the eleventh embodiment of the present invention.

Further, it is possible to accurately determine whether or not the terminal device is existent around the video display device by using LAN communication, GPS communication, short-range wireless communication, face detection, or the like, or a combination thereof.

Twelfth Embodiment

Figure 25:
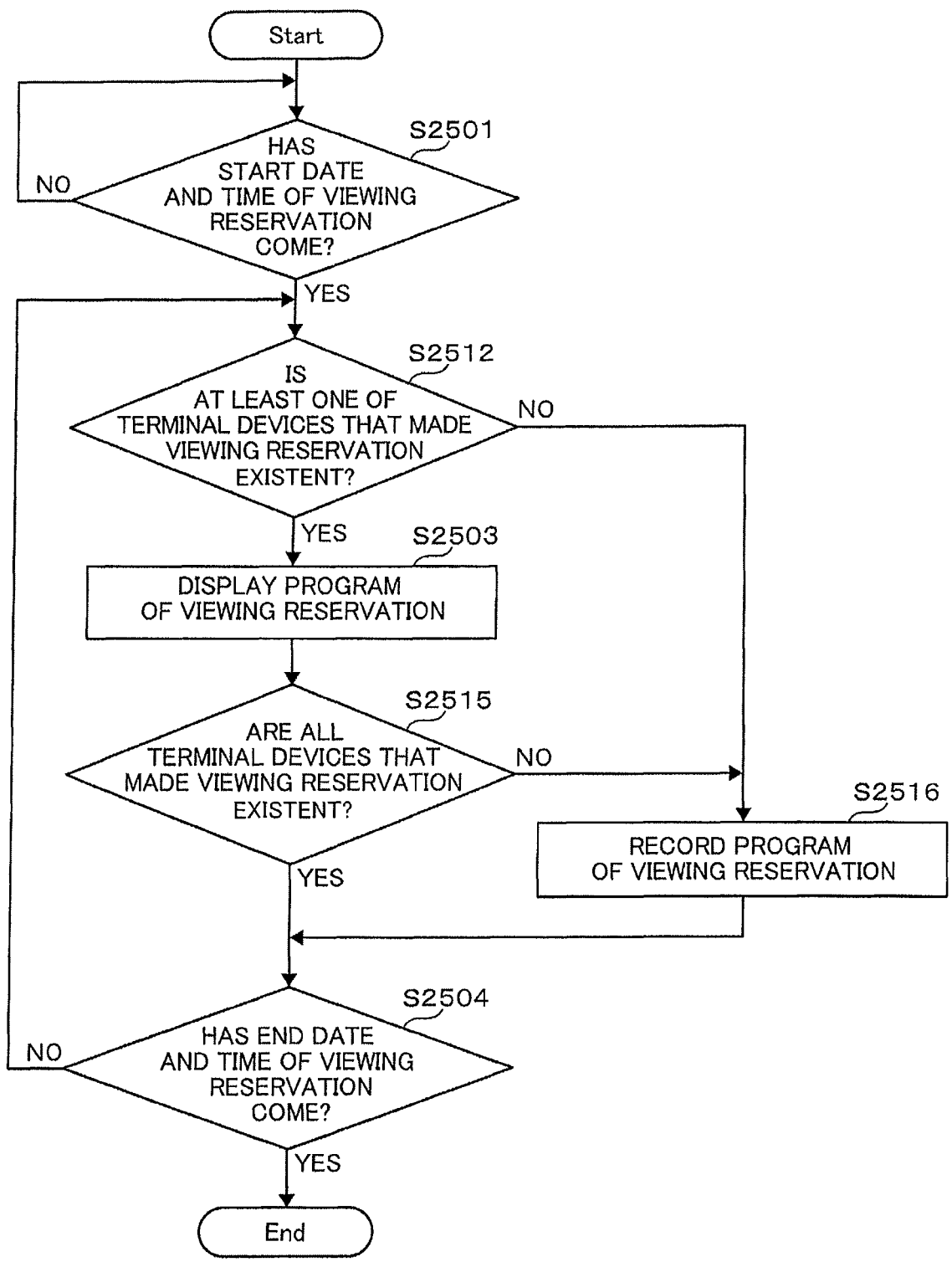
FIG. 25 is an example of the flowchart showing the process of executing the viewing reservation by the video display device.

FIG. 25 is a flowchart showing a process of executing a viewing reservation by the video display device in the twelfth embodiment of the present invention. This flowchart shows the execution process by the video display device 240 when a time of a viewing reservation set in the terminal device 1 has come.

FIG. 26 shows a structure example of viewing reservation data stored in the memory 305 of the video display device 240.

This viewing reservation data shows an example in which viewing reservations with reservation numbers 1, 2, 3, . . . , 5 have been made by the terminal device in that order. For example, the reservation number 3 shows that a viewing reservation has been made for a program 1 by a plurality of terminal devices 1a and 1b, the program 3 is to be broadcast on the terrestrial digital broadcasting channel 1, the start date and time is Nov. 15, 2012, 21:00, and the end date and time is Nov. 15, 2012, 22:00.

In Step S2501 of FIG. 25, the video display device 240 waits for the start date and time of the viewing reservation, and goes to Step S2512 when the start date and time has come. It is assumed here that the start date and time of the reservation number 3 has come.

In Step S2512, the video display device 240 switches the process in accordance with whether or not at least one of the terminal devices 1a and 1b that have made the viewing reservation with the reservation number 3 is existent around the video display device 240. In a case where at least one of the terminal devices 1a and 1b is existent around the video display device 240, the video display device 240 goes to Step S2503 and displays the program 3 of the viewing reservation on the video display device 240. When the video display device 240 is displaying another program, the other program is switched to the program 3.

Then, in Step S2515, the video display device 240 switches the process in accordance with whether or not both the terminal devices 1a and 1b that have made the viewing reservation with the reservation number 3 are existent around the video display device 240. In a case where both the terminal devices 1a and 1b are existent, the video display device 240 goes to Step S2504 and confirms whether or not the end date and time of the viewing reservation with the reservation number 3 has come. When the end date and time of the viewing reservation has come, the video display device 240 ends the process. When the end date and time of the viewing reservation has not come, the video display device 240 goes back to Step S2512 and continues the process. In this manner, the video display device 240 continues to confirm whether or not the terminal device 1a, 1b is existent around it until the end date and time of the viewing reservation comes.

In a case where neither of the terminal devices 1a and 1b is existent in Step S2512, the video display device 240 goes to Step S2516 and records the reserved program 3.

Further, in a case where only one of the terminal devices 1a and 1b is existent in Step S2515, the video display device 240 also goes to Step S2516 and records the reserved program 1.

In this manner, when at least one of the terminal devices 1a and 1b that have made the viewing reservation is existent around the video display device 240 at the start date and time of the viewing reservation with the reservation number 3, for example, the program 3 is displayed on the video display device 240 as in the viewing reservation. In a case where at least one of the terminal devices 1a and 1b is not existent, the program 3 is recorded.

Whether or not the terminal device 1a, 1b is existent around the video display device 240 can be confirmed by LAN communication, GPS communication, short-range wireless communication, face detection, or the like.

Although an example including two terminal devices is described, the same operation can also be performed in a case of three or more terminal devices.

With the above configuration, the same effects as those in the sixth embodiment can be obtained in the twelfth embodiment of the present invention.

Further, in a case where the same reserved program is set by a plurality of terminal devices, the reserved program is displayed when at least one of the terminal devices is existent around the video display device, and is recorded when at least one of the terminal devices is not existent. Therefore, the user of the terminal device that has made the reservation can surely view the program.

Thirteenth Embodiment

Figure 27:
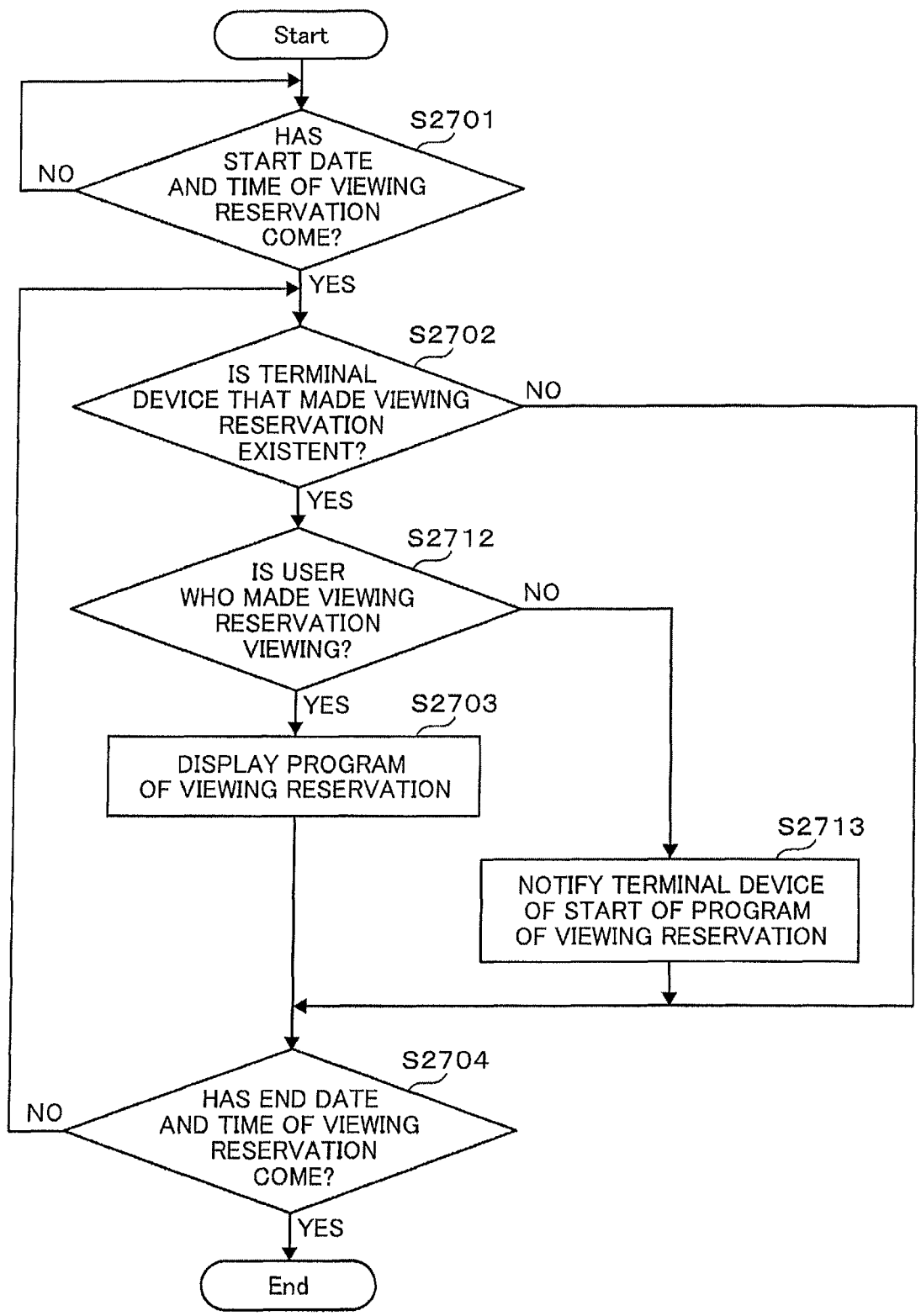
FIG. 27 is an example of the flowchart showing the process of executing the viewing reservation by the video display device.

FIG. 27 is a flowchart showing a process of executing a viewing reservation by the video display device in the thirteenth embodiment of the present invention. This flowchart shows the execution process by the video display device 240 when the time of the viewing reservation set in the terminal device 1 has come.

The video display device 240 waits for the start date and time of the viewing reservation in Step S2701, and goes to Step S1702 when the start date and time has come. It is assumed here that the start date and time of the reservation number 1 has come.

In Step S2702, the video display device 240 switches the process in accordance with whether or not the terminal device 1a that has made the viewing reservation with the reservation number 1 is existent around the video display device 240. In a case where the terminal device 1a is existent around the video display device 240, the video display device 240 goes to Step S2712 and confirms whether or not the user of the terminal device 1a is viewing the video display device 240. Whether or not the terminal device 1a is existent around the video display device 240 is confirmed by LAN communication, GPS communication, short-range wireless communication, or the like, while it is confirmed by face detection whether or not the user of the terminal device 1a is viewing the video display device 240.

In a case where the user of the terminal device 1a that has made the viewing reservation with the reservation number 1 is viewing the video display device 240 in Step S2712, the video display device 240 goes to Step S2703 and displays the program 1 of the viewing reservation on the video display device 240. When the video display device 240 is displaying another program, the other program is switched to the program 1. In a case where the user of the terminal device 1a is not viewing the video display device 240, the video display device 240 goes to Step S2713 to notify the terminal device 1a that the start time of the program of the viewing reservation has come.

Then, the video display device 240 confirms in Step S2704 whether or not the end date and time of the viewing reservation with the reservation number 1 has come. When the end date and time of the viewing reservation has come, the video display device 240 ends the process. When the end date and time of the viewing reservation has not come, the video display device 240 goes back to Step S2702 and continues the process. In this manner, the video display device 14 continues to confirm whether or not the terminal device 1a is existent around it until the end date and time of the viewing reservation comes.

In this manner, in a case where, at the start date and time of the viewing reservation with the reservation number 1, the terminal device 1a that has made that viewing reservation is existent around the video display device 240 and the user of the terminal device 1a is viewing the video display device 240, the program 1 is displayed on the video display device 240 as in the viewing reservation. In a case where that user is not viewing, the video display device 240 notifies the terminal device 1a that the start time of the program of the viewing reservation has come.

With the above configuration, the same effects as those in the sixth embodiment can be obtained in the thirteenth embodiment of the present invention.

Further, in a case where, at the start date and time of the viewing reservation, the user of the terminal device that has made that viewing reservation is not viewing the video display device although the user is existent around the video display device, that terminal device is notified that the start time of the program of the viewing reservation has come. Therefore, the user of that terminal device can surely view the program.

The aforementioned embodiments are described in detail for intelligible description of the present invention, but are not intended to limit the present invention to include all the described components. Further, the configuration of an embodiment can be partly replaced with the configuration of another embodiment. Also, the configuration of an embodiment can be added to the configuration of another embodiment. Furthermore, for a portion of the configuration of each embodiment, an addition of another configuration and a replacement with another configuration can be performed. Also, a portion of the configuration of each embodiment can be deleted.

In addition, each of the aforementioned configurations, functions, processing units, processing means, and the like can be partly or entirely implemented by hardware by being designed by an integrated circuit, for example. Further, each of the aforementioned configurations, functions, and the like can be implemented by software by interpretation and execution of a program that achieves each function by a processor. Information such as the program achieving each function, a table, and a file can be stored in a storage device, e.g., a memory, a hard disk, and an SSD (Solid State Drive), or a storage medium, e.g., an IC card and an SD card.

Control lines and information lines that can be necessary for description are shown, but all control lines and all information lines in a product are not necessarily shown. It can be considered that almost all components are mutually connected actually.

LIST OF REFERENCE SIGNS

1 . . . terminal device, 2 . . . remote controller, 3 . . . video display device, 5 . . . broadcast station, 6 . . . wireless router, 7 . . . network, 200 . . . control unit, 201 . . . signal receiver, 202 . . . display, 203 . . . audio output unit, 204 . . . operation unit, 205 . . . memory, 206 . . . LAN communication unit, 207 . . . video input unit, 208 . . . audio input unit, 209 . . . short-range wireless communication unit, 210 . . . GPS receiver, 300 . . . control unit, 301 . . . signal receiver, 302 . . . display, 303 . . . audio output unit, 304 . . . infrared communication unit, 305 . . . memory, 306 . . . LAN communication unit

The invention claimed is:

1. A mobile terminal comprising:
a position information acquisition circuitry configured to acquire position information of a current position of the mobile terminal;
a memory configured to store position information of a destination and a start date and time of a scheduled event, the destination being a place of the event;
a display configured to display a notification; and
a controller configured to control at least the display in a control mode for notification,
wherein the controller is configured to:
when determining that the current position of the mobile terminal does not coincide with the position information of the destination, calculate a traveling time of a traveling route, among a plurality of traveling routes, from the current position of the mobile terminal to the destination, calculate a date and time of departure from the current position based on the start date and time of the scheduled event and the traveling time, and control the display to display a notification when the date and time of departure is reached,
wherein the memory is configured to store priority information of the event, and
wherein the controller is configured to switch in accordance with the priority information of the stored event whether the display displays the notification or not when a predetermined time before the date and time of departure date is reached.

2. A mobile terminal comprising:
a position information acquisition circuitry configured to acquire position information of a current position of the mobile terminal;
a memory configured to store position information of a destination and a start date and time of a scheduled event, the destination being a place of the event;
a display configured to display a notification; and
a controller configured to control at least the display in a control mode for notification,
wherein the controller is configured to:
when determining that the current position of the mobile terminal does not coincide with the position information of the destination, calculate a traveling time of a traveling route, among a plurality of traveling routes, from the current position of the mobile terminal to the destination, calculate a date and time of departure from the current position based on the start date and time of the scheduled event and the traveling time, and control the display to display a notification when the date and time of departure is reached, and
wherein the controller is configured to control the display to display the notification again when determining the position information of the current position of the mobile terminal has not changed within a predetermined period of time after displaying the notification.

3. The mobile terminal according to claim 1,
wherein, when determining that the current position of the mobile terminal coincides with the position information of the destination, the controller is configured to display information with reference to the start date and time of the scheduled event.

4. The mobile terminal according to claim 1,
wherein when determining that the current position of the mobile terminal does not coincide with the position information of the destination, the controller is configured to, as an alternative control, calculate a traveling time of a travelling route selected by a user among a plurality of travelling routes from the current position of the mobile terminal to the destination, calculate a date and time of departure from the current position based on the start date and time of the scheduled event and the traveling time of the travelling route selected by the user, and control the display to display a notification when the date and time of departure is reached.

5. The mobile terminal according to claim 4,
wherein the controller is configured to control the display to display a notification again when the position information of the current position of the mobile terminal has not changed within a predetermined period of time after displaying the notification based on the traveling time of the travelling route selected by the user.

6. The mobile terminal according to claim 2,
wherein, when determining that the current position of the mobile terminal coincides with the position information of the destination, the controller is configured to display information with reference to the start date and time of the scheduled event.

7. The mobile terminal according to claim 2,
wherein when determining that the current position of the mobile terminal does not coincide with the position information of the destination, the controller is configured to, as an alternative control, calculate a traveling time of a travelling route selected by a user among a plurality of travelling routes from the current position of the mobile terminal to the destination, calculate a date and time of departure from the current position based on the start date and time of the scheduled event and the traveling time of the travelling route selected by the user, and control the display to display a notification when the date and time of departure is reached.

8. A method executed by a mobile terminal including:
a central processing circuitry (CPU); a memory, connected to the CPU, configured to store position information of a destination and a start date and time of a scheduled event, the destination being a place of the event; and a Global Positioning System receiver connected to the CPU, configured to acquire position information of a current position of the mobile terminal; and at least one of a speaker and a display connected to the CPU;
the method comprising steps, executed by the CPU, of:
when determining that the current position of the mobile terminal does not coincide with the position information of the destination, calculating a traveling time of a traveling route, among a plurality of traveling routes, from the current position of the mobile terminal to the destination, calculating a date and time of departure from the current position based on the start date and time of the scheduled event and the traveling time, and displaying a notification when the date and time of departure is reached;
storing, by the memory, priority information of the event; and
switching in accordance with the priority information of the stored event whether the display displays the notification or not when a predetermined time before the date and time of departure date is reached.

9. A method executed by a mobile terminal including:
a central processing circuitry (CPU); a memory, connected to the CPU, configured to store position information of a destination and a start date and time of a scheduled event, the destination being a place of the event; and a Global Positioning System receiver connected to the CPU, configured to acquire position information of a current position of the mobile terminal; and at least one of a speaker and a display connected to the CPU;
the method comprising steps, executed by the CPU, of:
when determining that the current position of the mobile terminal does not coincide with the position information of the destination, calculating a traveling time of a traveling route, among a plurality of traveling routes, from the current position of the mobile terminal to the destination, calculating a date and time of departure from the current position based on the start date and time of the scheduled event and the traveling time, and displaying a notification when the date and time of departure is reached; and
displaying a notification again when the position information of the current position of the mobile terminal has not changed within a predetermined period of time after displaying the notification based on the traveling time of the travelling route selected by the user.

10. The method of the mobile terminal according to claim 8,
further comprising the steps, executed by the CPU, of:
when determining that the current position of the mobile terminal coincides with the position information of the destination, displaying information with reference to the start date and time of the scheduled event.

11. The method of the mobile terminal according to claim 8,
further comprising the steps, executed by the CPU, of:
when determining that the current position of the mobile terminal does not coincide with the position information of the destination, as an alternative control, calculating a traveling time of a travelling route selected by a user among a plurality of travelling routes from the current position of the mobile terminal to the destination, calculating a date and time of departure from the current position based on the start date and time of the scheduled event and the traveling time of the travelling route selected by the user, and displaying a notification when the date and time of departure is reached.

12. The method of the mobile terminal according to claim 11,
further comprising the steps, executed by the CPU, of:
displaying the notification again when determining the position information of the current position of the mobile terminal has not changed within a predetermined period of time after displaying the notification.

13. The method of the mobile terminal according to claim 9,
further comprising the steps, executed by the CPU, of:
when determining that the current position of the mobile terminal coincides with the position information of the destination, displaying information with reference to the start date and time of the scheduled event.

14. The method of the mobile terminal according to claim 9,
further comprising the steps, executed by the CPU, of:
when determining that the current position of the mobile terminal does not coincide with the position information of the destination, as an alternative control, calculating a traveling time of a travelling route selected by a user among a plurality of travelling routes from the current position of the mobile terminal to the destination, calculating a date and time of departure from the current position based on the start date and time of the scheduled event and the traveling time of the travelling route selected by the user, and displaying a notification when the date and time of departure is reached.

* * * * *